US011505930B2

(12) United States Patent
Meyers

(10) Patent No.: US 11,505,930 B2
(45) Date of Patent: Nov. 22, 2022

(54) FLOOR DRAIN SYSTEM

(71) Applicant: EBBE AMERICA, LC, Clearfield, UT (US)

(72) Inventor: Lawrence G. Meyers, Clearfield, UT (US)

(73) Assignee: EBBE AMERICA LC, Clearfield, UT (US)

( * ) Notice: Subject to any disclaimer, the term of this patent is extended or adjusted under 35 U.S.C. 154(b) by 233 days.

(21) Appl. No.: 16/809,249

(22) Filed: Mar. 4, 2020

(65) Prior Publication Data

US 2020/0291628 A1     Sep. 17, 2020

Related U.S. Application Data

(60) Provisional application No. 62/818,209, filed on Mar. 14, 2019.

(51) Int. Cl.
*E03C 1/12*   (2006.01)
*A47K 3/40*   (2006.01)
*E03F 5/04*   (2006.01)

(52) U.S. Cl.
CPC ............... *E03C 1/12* (2013.01); *A47K 3/405* (2013.01); *E03F 5/0408* (2013.01)

(58) Field of Classification Search
CPC ............... A47K 3/40–405; A47K 4/00; E03F 2005/0413; E03F 5/0408–0409; E04H 4/1227–1236; E04H 1/1216
See application file for complete search history.

(56) References Cited

U.S. PATENT DOCUMENTS

| 5,002,430 | A  | * | 3/1991 | Smith | ...................... E02B 15/08 |
|---|---|---|---|---|---|
| | | | | | 405/66 |
| 6,755,966 | B1 | * | 6/2004 | Reed | ...................... E03F 5/0408 |
| | | | | | 210/164 |
| 8,561,224 | B2 | * | 10/2013 | Cook | ....................... A47K 3/40 |
| | | | | | 4/604 |
| 8,850,633 | B2 | * | 10/2014 | Erlebach | ................... E03F 5/04 |
| | | | | | 4/679 |
| 9,307,869 | B2 | * | 4/2016 | DeJesus | .................... E04B 1/64 |
| 9,382,701 | B2 | * | 7/2016 | Meyers | ................... E03F 3/046 |
| 9,611,634 | B2 |   | 4/2017 | Erlebach | |
| 10,724,225 | B2 | * | 7/2020 | Brill | ........................ E03F 5/0408 |
| 2011/0067175 | A1 |   | 3/2011 | Steylaerts et al. | |
| 2012/0023658 | A1 | * | 2/2012 | Bobeck | ................. E03F 5/0408 |
| | | | | | 4/679 |

(Continued)

FOREIGN PATENT DOCUMENTS

EP       3366852 A1    8/2018
GB       2524291 A     9/2015

*Primary Examiner* — David P Angwin
*Assistant Examiner* — Nicholas A Ros
(74) *Attorney, Agent, or Firm* — Workman Nydegger

(57) ABSTRACT

A floor drain system for installation in a tile floor over a subfloor includes at least one drain module. The drain module has a drain body defining an inlet and installable in the subfloor. The drain body is configured for attachment to a drain pipe below the subfloor. A drain trim assembly defines a linear drain channel sloping along a length of the drain trim assembly that is intercepted by an outlet positionable over the drain body. The drain trim assembly is configured for installation with the tile floor entirely above the subfloor and without physically interfacing with an opening of the drain body.

20 Claims, 14 Drawing Sheets

(56) References Cited

U.S. PATENT DOCUMENTS

| | | |
|---|---|---|
| 2013/0174921 A1 | 7/2013 | Scluter |
| 2013/0318704 A1 | 12/2013 | Plank |
| 2016/0270604 A1* | 9/2016 | McLeod ............... E03F 5/0408 |
| 2018/0110379 A1* | 4/2018 | Wadaga .................... E03C 1/12 |

* cited by examiner

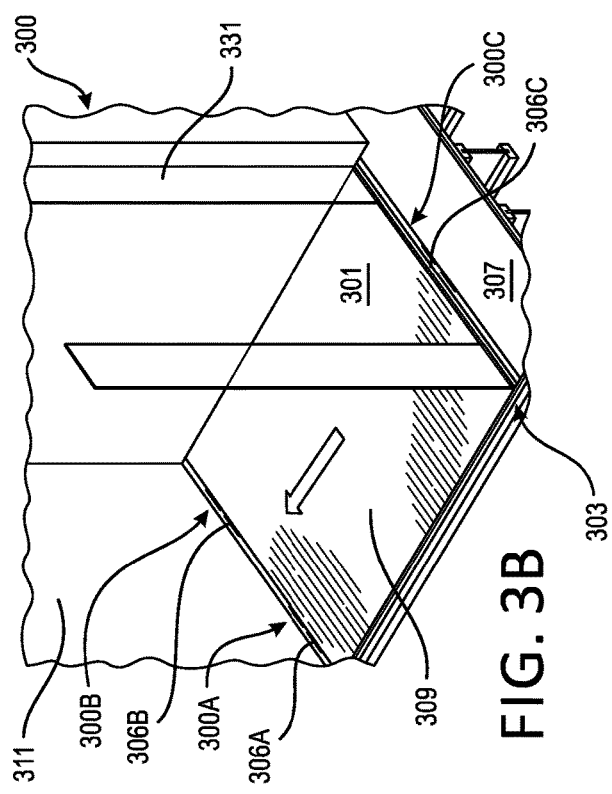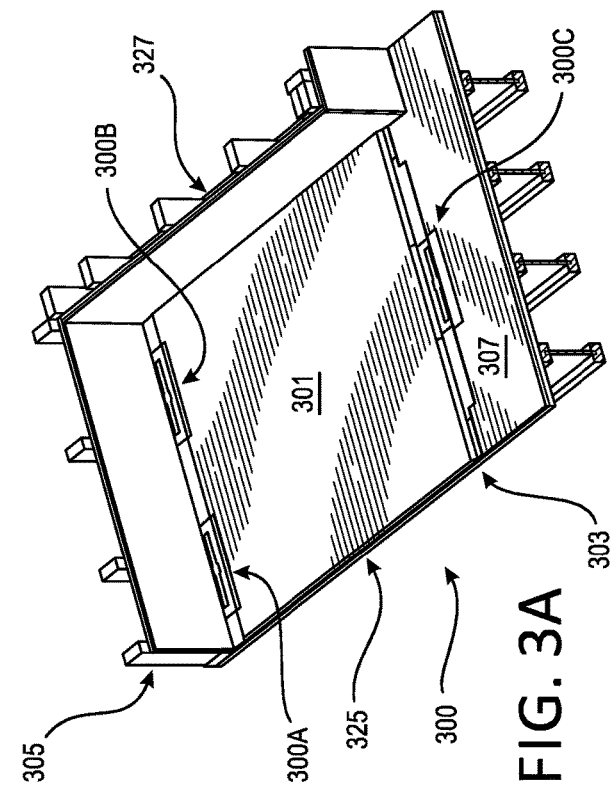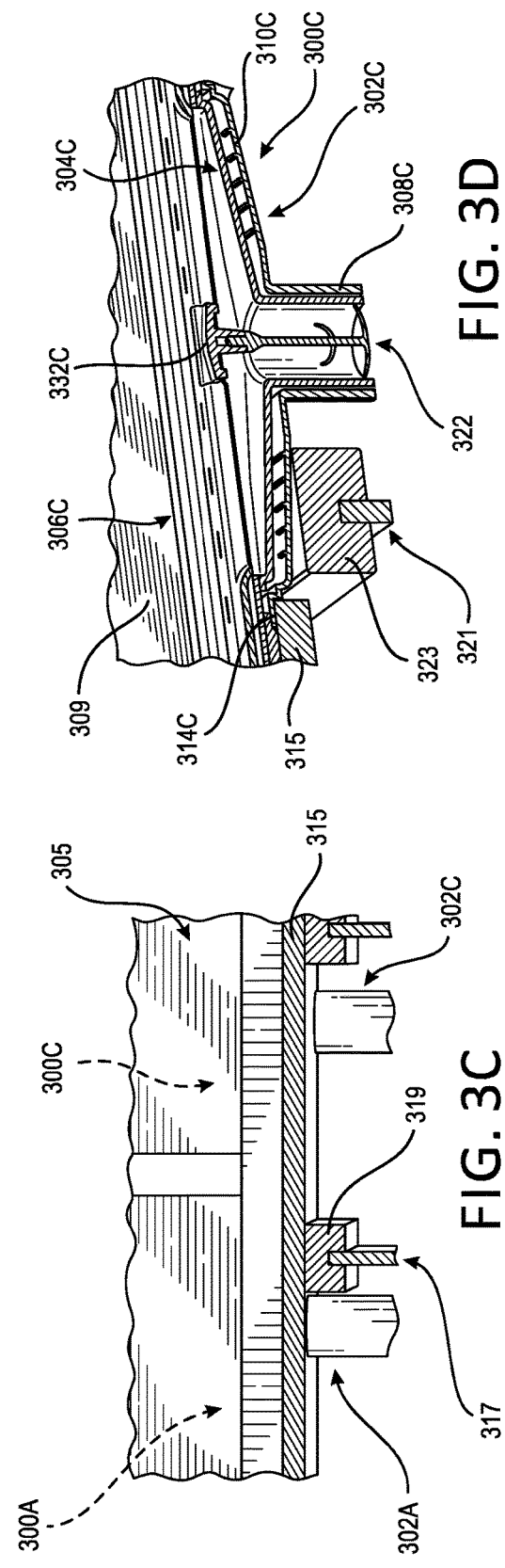

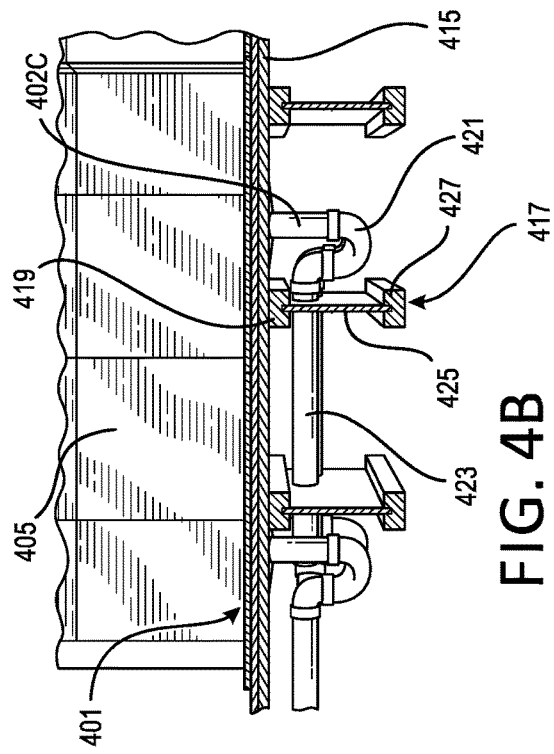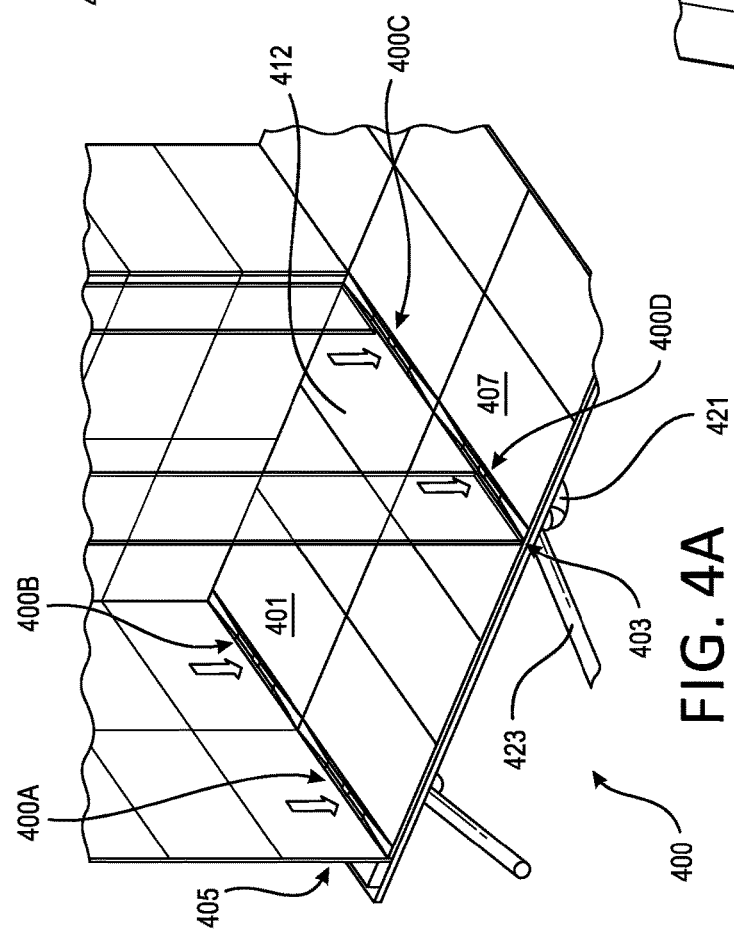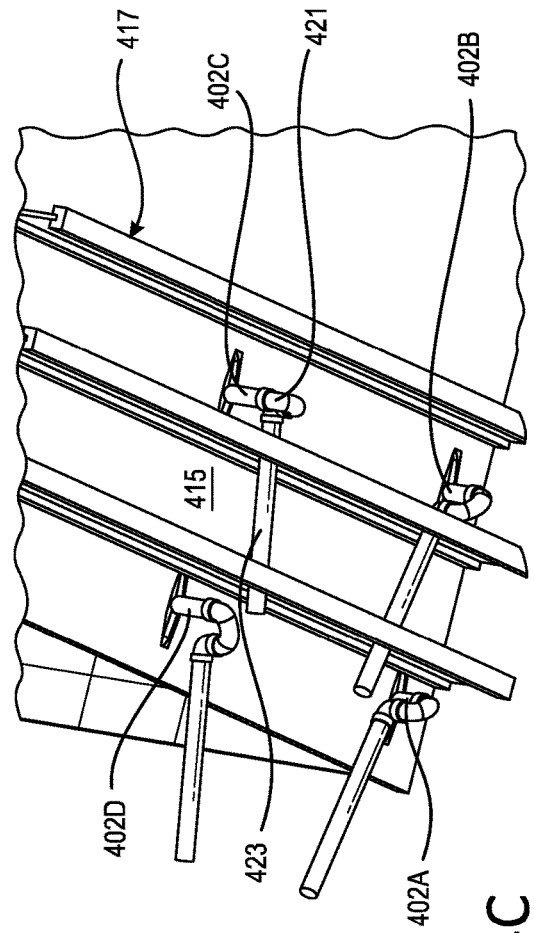
FIG. 4B
FIG. 4C
FIG. 4A

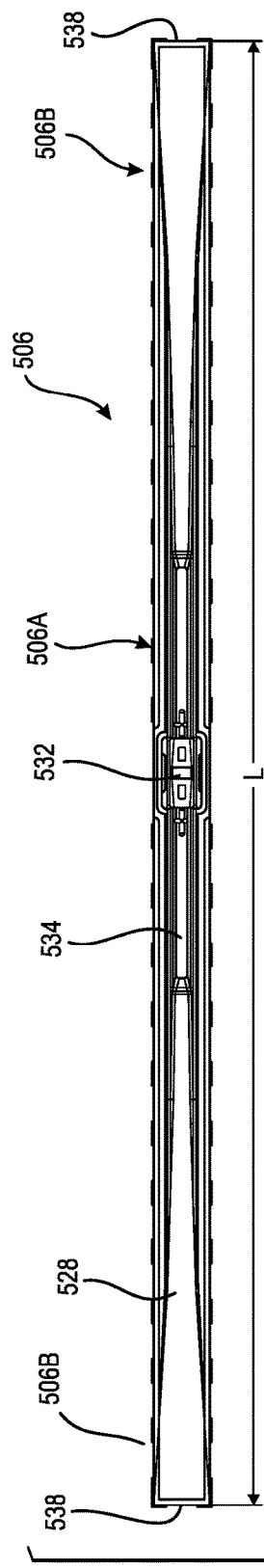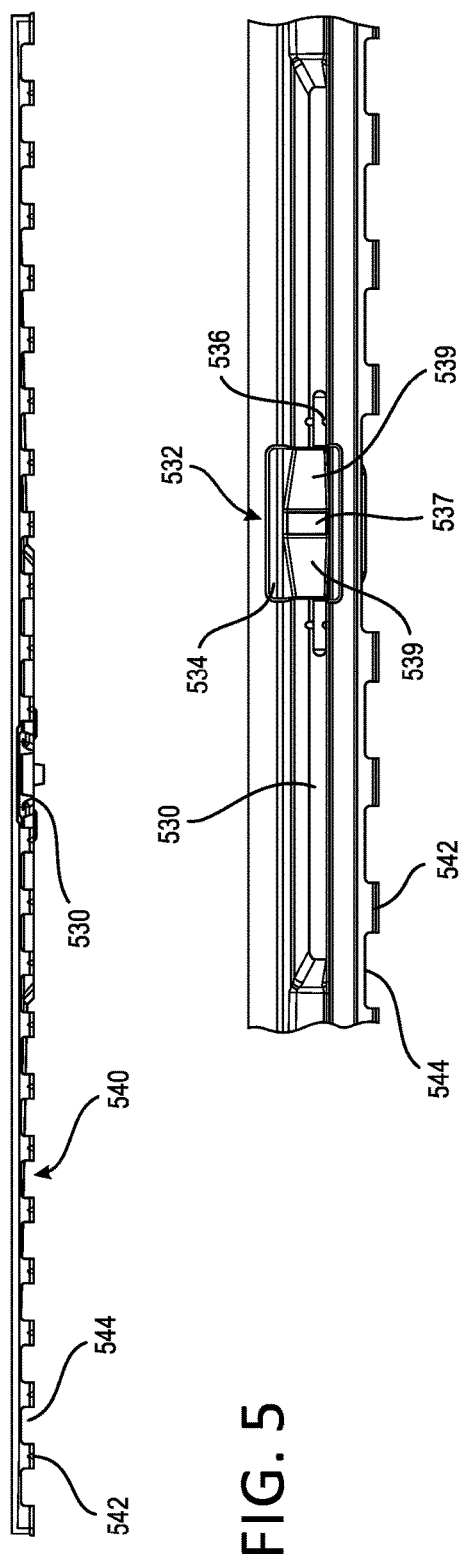
FIG. 5
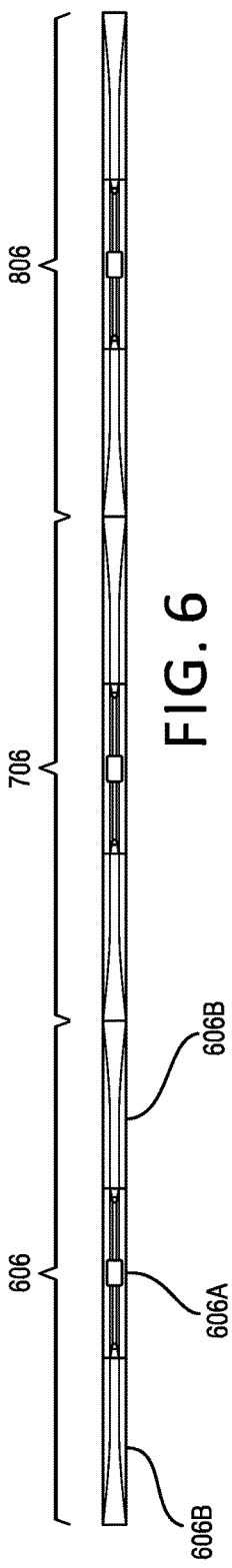
FIG. 6

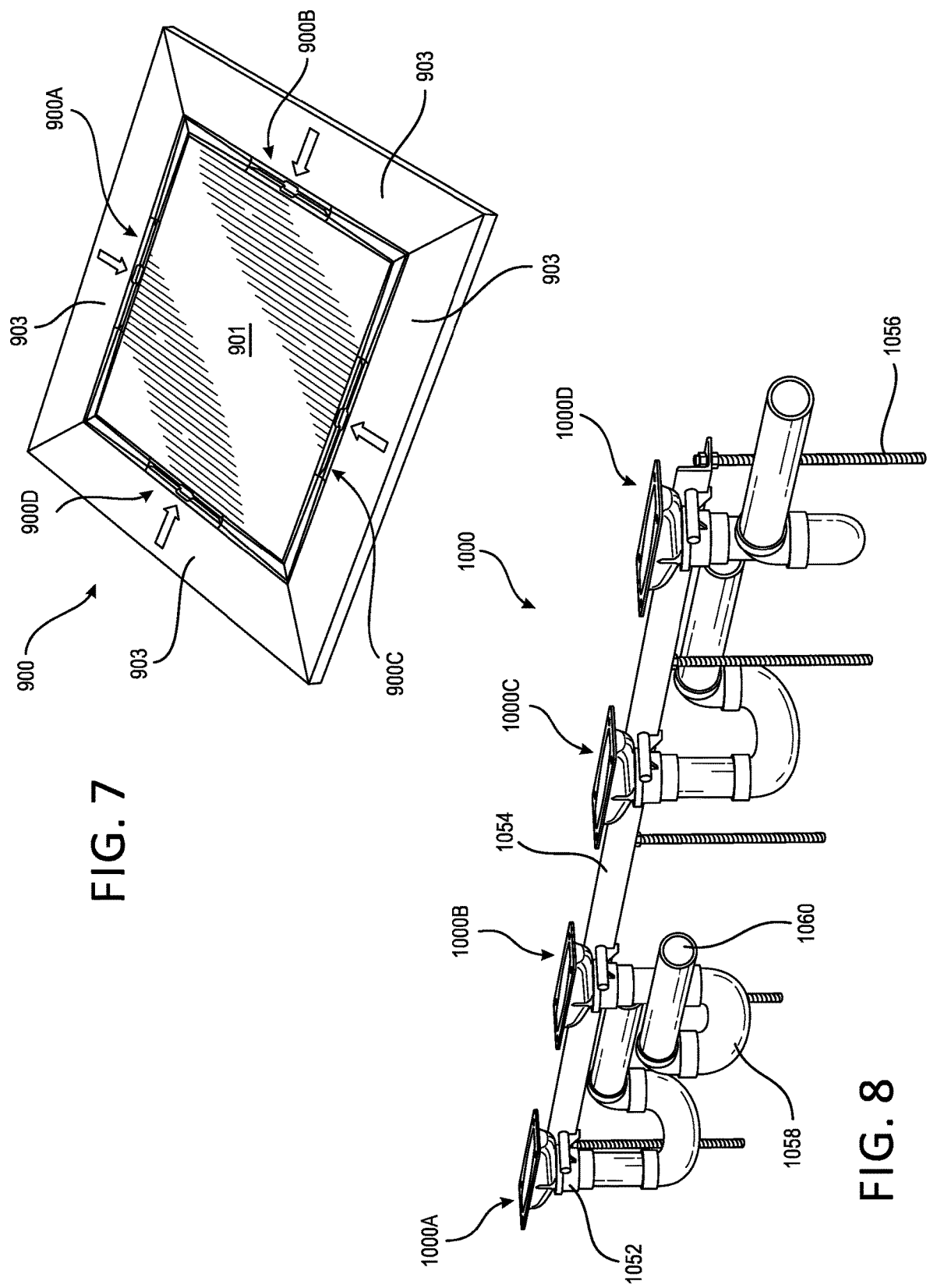

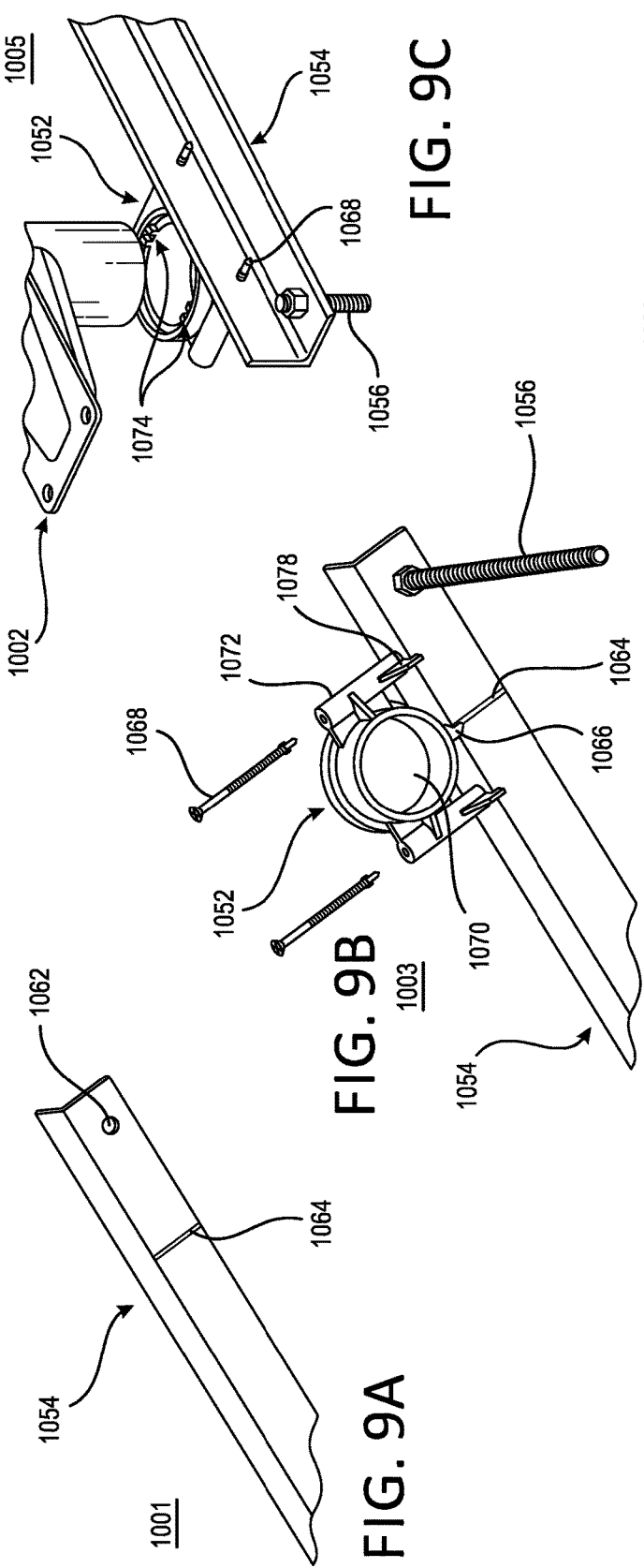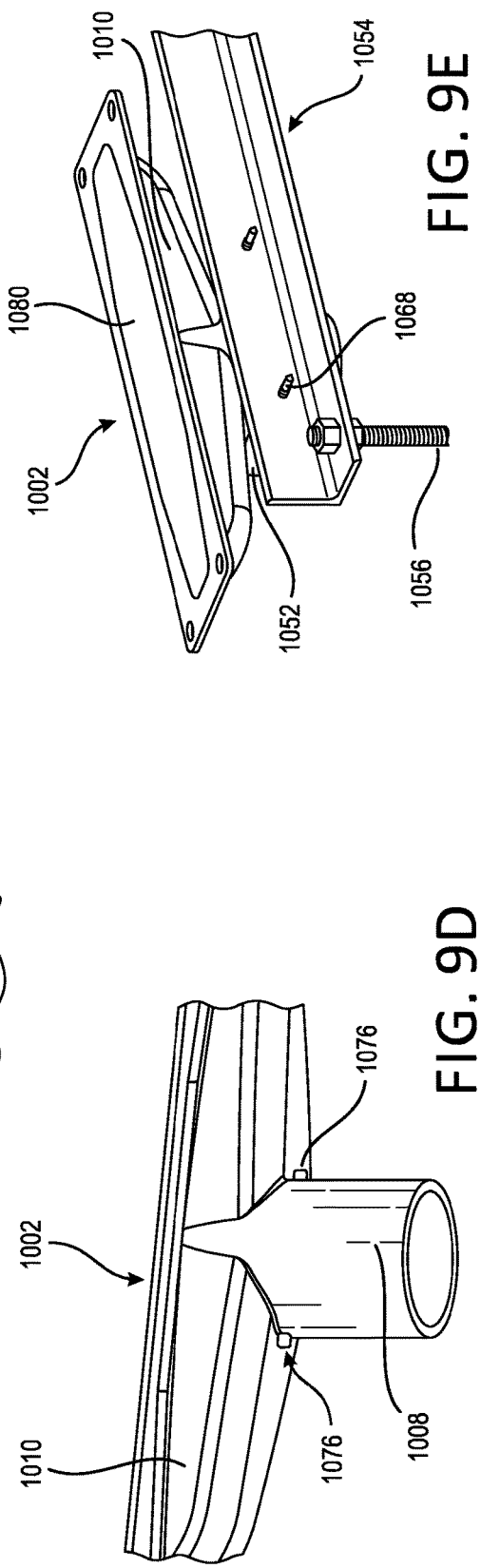

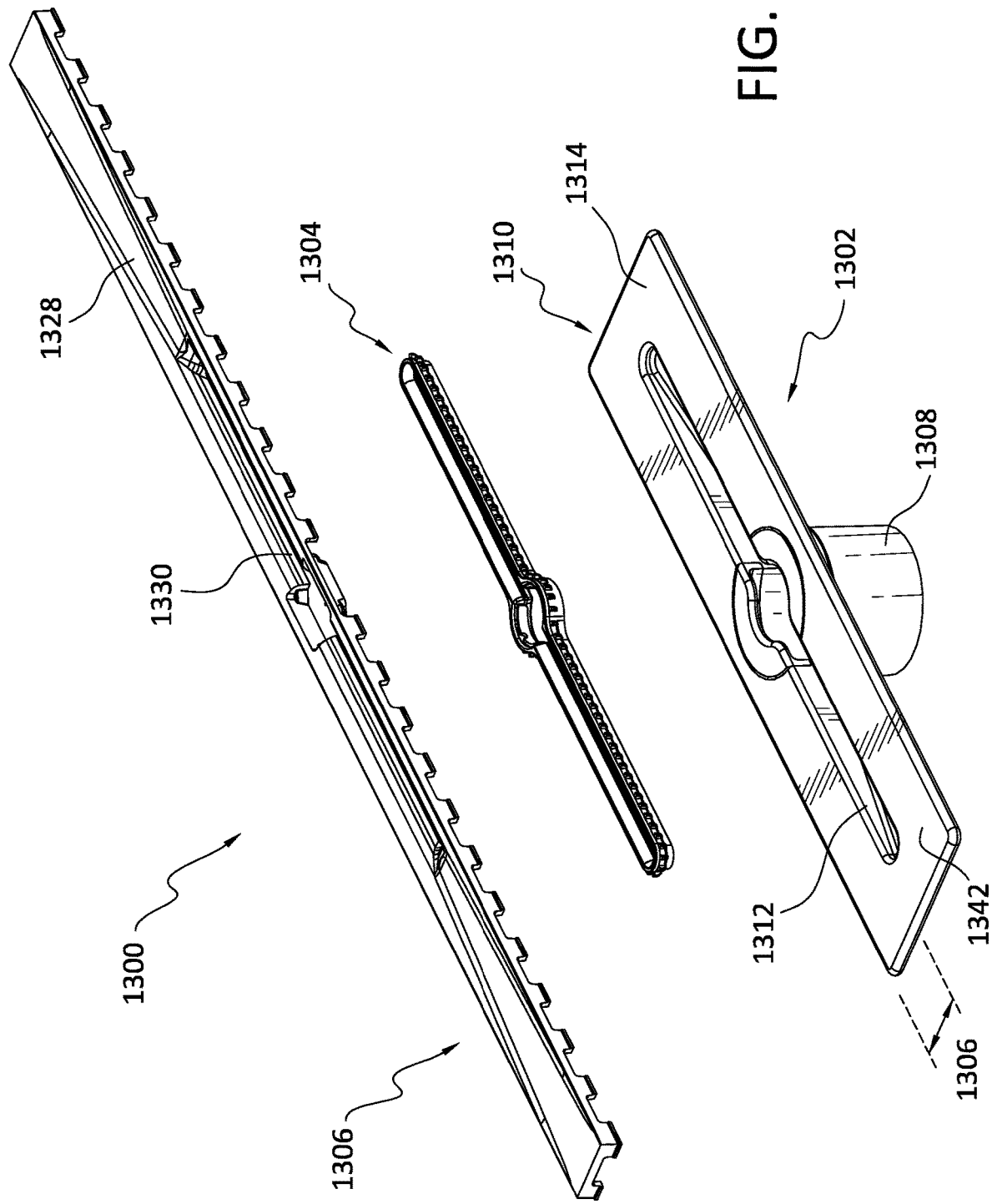

FLOOR DRAIN SYSTEM

TECHNICAL FIELD

The disclosure relates to a floor drain system for use in a tile floor.

BACKGROUND

Barrier free wet floor areas (e.g., showers) are growing increasingly popular. Growth in demand can be related to the appearance created with barrier free construction as well as the benefits in functionality. Barrier free implies that there is no curb or obstruction to entering a wet floor area. A wet floor area without a barrier or curb can provide a contemporary look and improve accessibility. In addition, people with physical impairments may require a barrier free entrance. As baby boomers age, that need is likely to increase.

Despite all the benefits, there are several drawbacks with barrier free wet floor areas such as the difficultly of providing enough slope to ensure proper drainage. In addition, there are several areas of conflict between characteristic plumbing code and accessibility requirements established by the Americans with Disabilities Act (ADA). For example, plumbing codes regularly require that the threshold (or high point) in a wet floor area must be at least 2 inches above the drain. This requirement is intended to provide a visual and physical warning to a person that a drain is malfunctioning by forcing water to pool within the wet floor area before it can escape.

On the other hand, the ADA requires a slope no more than ¼ inch per foot, a maximum barrier height of ½ inch and at least a distance of 4 feet from the entrance to the drain. To meet both plumbing code and ADA requirements, a barrier free wet floor area would have to be about 8 feet deep, which is generally cost and space prohibitive at most sites. Because plumbing inspectors generally have at least some enforcement discretion, construction professionals are regularly forced to deal with pushback and/or change request to both pass inspection and stay ADA compliant.

Additionally, known drain systems have created many installation issues in wet floor areas. For instance, these systems include parts that are difficult to correctly install or require the investment of significant amount of time for installation. In addition, known drain systems generally require that the subfloor is recessed, or the drain system is recessed in the subfloor to ensure proper drainage, making it difficult to install the drain system without compromising or complicating the stability of the floor. Moreover, space limitations and the subfloor's supporting structure (e.g., floor joists) can make it difficult to install the drain system and run the required plumbing from the drain. Known drain systems also often require plumbers and tile installers to perform tasks outside of their areas of expertise, increasing the likelihood of installation errors. For instance, tile installers making plumbing connections can result in costly and damaging leaks, and plumbers forming drainage slopes can result in poor drainage and significant property damage.

Accordingly, there is a need for a floor drain system that incorporates certain design improvements over other systems for low cost and easy installation in a tile floor.

SUMMARY

Embodiments of the present disclosure advantageously provide a floor drain system that incorporates certain design improvements over other systems for low cost and easy installation in a sloped wet floor area. Moreover, the streamlined design of the floor drain system allows it to be installed in several different configurations with minimal inference of support systems underlying the floor area.

According to a variation, a floor drain system of the present disclosure includes at least one drain module having a drain body defining an opening and installable in the subfloor. The drain body is configured for attachment to a drain pipe below the subfloor. A drain trim assembly defines a linear drain channel that is intercepted by an outlet positionable over the drain body. The drain trim assembly is configured for installation with the tile floor above the drain body and substantially above the subfloor. Optionally, the at least one drain module can include an upper drain component installable on the drain body and vertically adjustable relative thereto. The drain trim assembly can be installed in the tile floor without attachment to the upper drain component and without physically interfacing with an inlet of the upper drain component.

This advantageously helps to separate the plumbing associated with the installation of the drain body from the tile work associated with the installation of the drain trim assembly. For instance, a plumber can install the drain body in a subfloor and connect it to a drain pipe under the subfloor. A tile installer can then the install the drain trim assembly with the tile floor over the subfloor.

The drain module thus incorporates an open, linear drain channel within the tile floor, which, in turn, allows the drain module to collect and transport water in a wet floor area and prevent flooding without a barrier. This provides improved accessibility and a streamlined and easy installation process. In addition, the linear drain channel in the drain trim assembly can collect water on the tile floor above the subfloor, which is not recessed for installation purposes. This advantageously allows the drain module to provide more drainage with less modification or impact to the subfloor and the subfloor's supporting structure, providing a more economical and easier installation. For example, the drain module can reduce undesirable interference with or modification of the subfloor's supporting structure. In an embodiment, the drain body can be installed through the subfloor and generally between the floor joists without any cutting into the chords of the floor joists because the drain trim assembly collecting water is installed entirely above the subfloor.

According to a variation, the only cutting or modification of the floor joists required to install the drain module may be limited to cutouts formed in the webs for accommodating a drain pipe connected to the drain body. In addition, the drain body can be sized and configured to be substantially contained or located in the spacing between the floor joists in any desirable orientation.

According to a variation, the at least one drain module can comprise a plurality of drain modules tied, joined, or stitched together in a tile floor to achieve improved drainage with a lower slope floor and/or without an entry barrier. This can advantageously allow for a smaller sized wet floor area to help satisfy ADA requirements and/or local requirements imposed by plumbing inspectors. For instance, with first and second drain modules located along a backwall in a wet floor area, the wet floor area can have a slope of ⅛ inch per foot with a distance between the back wall and an entry that is significantly smaller than what is typically required by a plumbing inspector to meet ADA and/or local requirements in a wet floor area. The first and second drain modules provide redundant outlets at the backwall such that if one of the drain modules clogs or malfunctions, the outlet of the other drain module may still drain the wet floor area. Moreover, if one or both drain modules clog or malfunction along the backwall, a third drain module can be installed just outside or at the entry. This beneficially helps provide flood control with a minimal or no barrier at the entry.

BRIEF DESCRIPTION OF THE DRAWINGS

These and other features, aspects, and advantages of the present disclosure will become better understood regarding the following description, appended claims, and accompanying drawings.

FIGS. 3A-3D illustrate installation of the floor drain system in FIG. 1 according to another embodiment.

FIGS. 4A-4C illustrate installation of the floor drain system in FIG. 1 according to an embodiment.

FIG. 5 is a top, side, and detailed view of a drain trim assembly according to an embodiment.

FIG. 6 illustrates a drain trim assembly according to another embodiment.

FIG. 7 illustrate installation of the floor drain system in FIG. 7 according to another embodiment.

FIG. 8 illustrates a floor drain system according to another embodiment.

FIGS. 9A-9E illustrate installation of the floor drain system in FIG. 8 according to an embodiment.

FIG. 12 is an exploded view of a floor drain system according to another embodiment.

Figure 1:
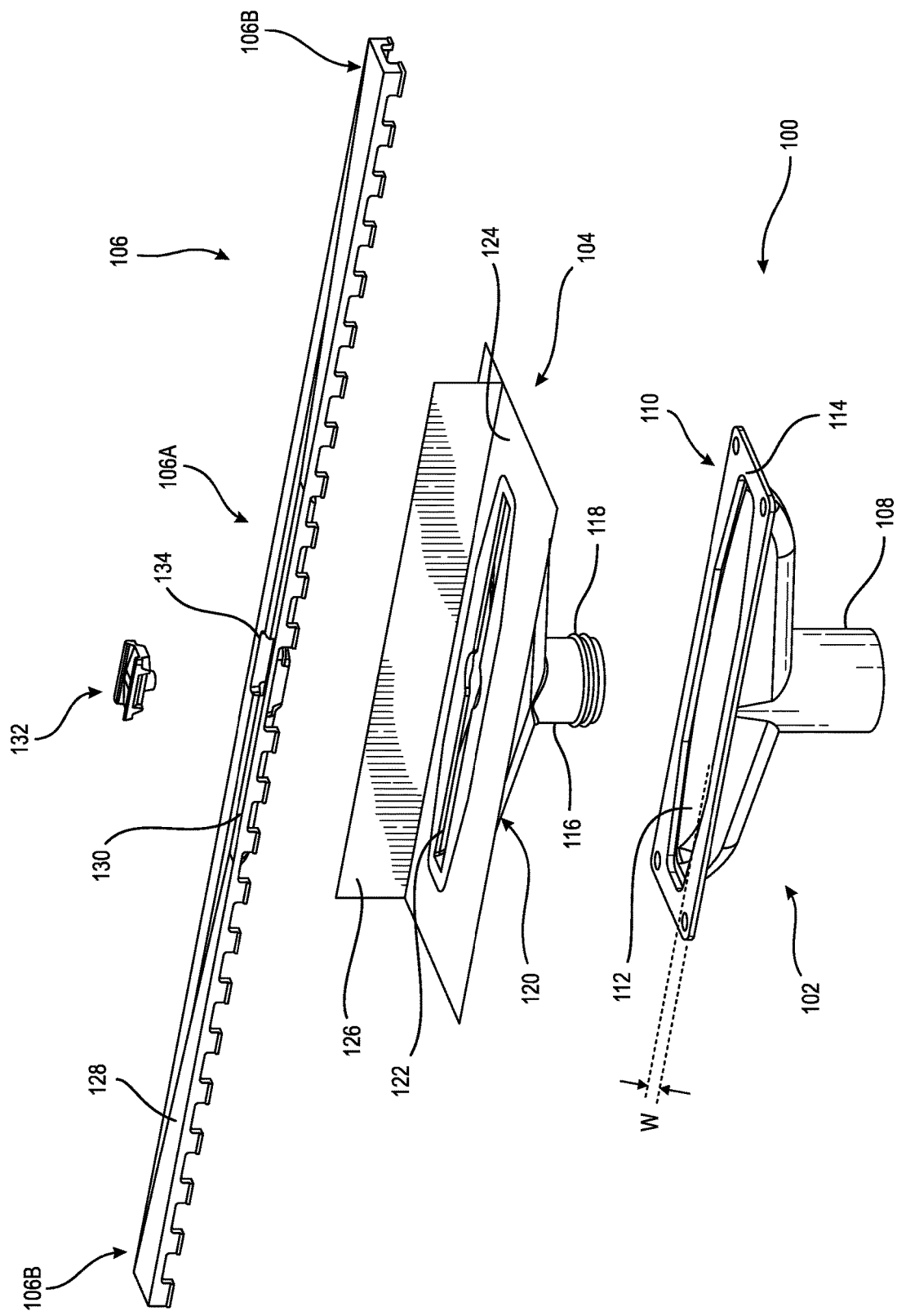
FIG. 1 is an exploded perspective view of a floor drain system according to an embodiment.

The drawing figures are not necessarily drawn to scale, but instead are drawn to provide a better understanding of the components, and are not intended to be limiting in scope, but to provide exemplary illustrations. The figures illustrate exemplary configurations of drain systems, and in no way limit the structures or configurations of a drain system and components according to the present disclosure.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning.

Embodiments of the present disclosure advantageously provide a floor drain system that incorporates certain design improvements over other systems for low cost and easy installation in a sloped wet floor area. Moreover, the streamlined design of the floor drain system allows it to be installed in several different configurations with minimal inference of support systems underlying the floor area. The floor drain system embodiments can be configured for traditional waterproofing installations or surface waterproofing installations. FIG. 1 illustrates a floor drain system comprising a drain module 100 including a drain body 102, an upper drain component 104, and a drain trim assembly 106. The drain body 102 can be installable in a subfloor (e.g., wood, concrete, or the like). For example, the drain body 102 can be configured to be fixed in and to the subfloor and includes a lower portion 108 defining an outlet and configured to mate with a plumbing system or drain pipe, and an upper portion 110. The upper portion can define an opening 112 and a flange 114 surrounding the opening 112. In the illustrated embodiment, the opening 112 can be configured to receive at least a portion of the upper drain component 104. In other embodiments, the opening 112 can comprise an inlet sized and configured to capture and convey water into the plumbing system or the drain pipe through the drain body 102.

As seen, the flange 114 of the drain body 102 defines a width W. The width W can be sized and configured to support and provide a connection area on an upper surface of the subfloor or a substrate. Optionally, the flange 114 can define a plurality of openings configured to receive one or more fasteners for attaching the drain body 102 to the subfloor. In other embodiments, the openings can be omitted and the flange 114 can be attached to the subfloor or a substrate via other methods such as via adhesives or thinset mortar.

The width W of the flange 114 at least in part can be configured to form a clearance between a backwall in a floor area (e.g., a wet floor area) and an inlet of the drain module 100. This clearance can allow the drain body 102 to sit against the backwall while providing enough room for the drain pipe below the subfloor to be attached to the lower portion 108.

According to a variation, the width W can vary between the sides of the drain body 102 to accommodate different sized tiles being installed in a tile floor or on the backwall contiguous with the tile floor. For instance, the flange 114 can have a smaller width W along one side that can be positioned against the backwall if a smaller tile (e.g., about ¼-inch-thick tile) is to be installed on the backwall over the drain body 102. This allows for the smaller tile to be installed on the backwall over the drain body 102 without undesirably extending over the opening 112. To accommodate a larger tile (e.g., a ⅜ inch thick tile) to be installed on the backwall over the drain body 102, the drain body 102 can be rotated 180 degrees so that a larger width W of the flange 114 faces the backwall, which, in turn, offsets the opening 112 a distance from its original position. This allows for accommodation of the larger tile over the drain body 102 without undesirably extending over the opening 112. The drain body 102 can have any suitable shape.

The upper drain component 104 can be adapted to receive and convey water from the floor area. In the illustrated embodiment, the upper drain component 104 comprises a drain riser installable on the drain body 102. For instance, the upper drain component 104 can be insertable in the opening 112 of the drain body 102 and can include a lower portion 116 configured to sealingly engage with the lower portion 108 of the drain body 102.

An outer surface of the lower portion 108 can carry at least one sealing member 118 arranged to resiliently compress between the lower portion 116 and an inner surface of the lower portion 108 of the drain body 102, forming a seal therebetween. The seal can make the drain module 100 usable in a surface waterproofing installation, with the drain body 102 and the upper drain component 104 watertight. For instance, the drain module 100 can installed using a hot mopping application. In other embodiments, the drain module 100 can be configured for a traditional waterproofing installation. For instance, the at least one sealing member 118 can be cut or scored so that water can pass or weep through the at least one sealing member 118.

In an embodiment, the lower portion 116 can have a cylindrical shape sized to nest or fit in the lower portion 108 of the drain body 102. In other embodiments the lower portion 116 can have an oval or square shape sized to fit within the lower portion 108 having a corresponding shape.

The upper drain component 104 can include an upper portion 120 defining an inlet 122 in fluid communication with the outlet of the drain body 102 via a lower opening in the lower portion 108. In an embodiment, the upper drain component 104 is vertically adjustable relative to the drain body 102 so that the height of the upper drain component 104 can be adjusted as desired. As discussed below, this vertical adjustment can be completed by a tile installer after the drain body 102 has been installed in a subfloor. For instance, the sealing engagement between the at least one sealing member 118 and the inner surface of the lower portion 108 can adjustably maintain the vertical position of the upper drain component 104 relative to the drain body 102 during installation of the drain module 100. It will be appreciated that the drain body 102 and the upper drain component 104 can be formed of any suitable material such as a molded plastic. For example, the drain body 102 and/or the upper drain component 104 can be formed of Poly Vinyl Chloride (PVC), Polypropylene (PP), Acrylonitrile butadiene styrene (ABS), or any other suitable material.

Optionally, an upper surface of the upper drain component 104 can include a bonding mat 124. The bonding mat 124 can comprise a woven fabric integrally molded onto the upper surface of the upper drain component 104 and arranged to help create mechanical or micromechanical bonds between the upper drain component 104 and a substrate, mortar, silicone, grout, or other material applied to the bonding mat 124. The bonding mat 124 can extend at least partially over the inlet 122 in the upper drain component 104 and includes at least one portion 126 that is movable or foldable relative to a connection between the bonding mat 124 and the upper surface of the upper drain component 104. In other embodiments, the bonding mat 124 can extend completely over the inlet 122 and be configured to be cut as needed during installation of the drain module 100. According to a variation, the bonding mat 124 can comprise a waterproof material.

Referring still to FIG. 1, the drain trim assembly 106 comprises a linear drain defining a linear drain channel 128. According to an embodiment, the linear drain channel 128 slopes along a length of the drain trim assembly 106 and is intercepted by an outlet 130. The drain trim assembly 106 does not include a cover such that the linear drain channel 128 is open to and easily accessible in a tile floor formed with one or more tiles. The absence of a cover also helps reduce or eliminate concealed fouling surfaces in the linear drain channel 128 which is easily cleanable.

The drain trim assembly 106 is adapted to be tiled and grouted in place with tiles forming the wet floor area with the outlet 130 positioned over the inlet 122 of the upper drain component 104 and/or the drain body 102. As such, when the drain trim assembly 106 is installed in a tile floor or wet floor area, the drain trim assembly 106 can be unattached or separate from the drain body 102 and/or the upper drain component 104 and does not substantially extend through or into a subfloor underlying the tiles like in conventional drain systems. More particularly, the drain trim assembly 106 is installable in the wet floor area over the drain body 102 and/or the inlet 122 of the upper drain component 104. This advantageously helps to separate the plumbing associated with the installation of the drain body 102 from the tile work associated with the installation of the drain trim assembly 106. For instance, a plumber can install the drain body 102 in a subfloor and connect it to a drain pipe under the subfloor. A tile installer can install the upper drain component 104 in the drain body 102 at a desired height and then install the drain trim assembly 106 with the tile floor over the subfloor. The outlet 130 and the inlet 122 can have a substantially same length or different lengths.

In the illustrated embodiment, the drain trim assembly 106 does not physically interface with the drain body 102 and/or the upper drain component 104, the drain trim assembly 106 can be floatable over the drain body 102 and/or the upper drain component 104 for lateral and/or rotational adjustment of the drain trim assembly relative to the drain body 102 and/or the upper drain component 104. This floating configuration of the drain trim assembly 106 can be advantageous because it allows the drain trim assembly 106 to be aligned or squared to a wall (e.g., a backwall) or other benchmark, up until when the adjacent tiles are installed around the drain trim assembly 106 during a tile installation, streamlining installation. For instance, the outlet 130 of the drain trim assembly 106 can be offset or rotated relative to the inlet 122 of the upper drain component 104 as needed before being set in an overlying mortar bed by a tile installer, allowing the drain trim assembly 106 to better integrate with the tile floor.

The drain module 100 thus incorporates an open, linear drain channel 128 within the tile floor, which, in turn, allows the drain module 100 to collect and transport water in a wet floor area and prevent flooding without a barrier. It provides improved accessibility and a streamlined and easy installation process.

It also beneficially helps minimize the impact of the drain module 100 below a subfloor (see, e.g., subfloor 415 shown in FIG. 4C). For example, the drain module 100 can reduce undesirable interference with or modification of the subfloor's supporting structure (see, e.g., floor joists 417 shown in FIG. 4C). In an embodiment, the drain body 102 can be installed through the subfloor and generally between the floor joists without any cutting into the chords of the floor joists because the drain trim assembly 106 collecting water is installed entirely above the subfloor. According to a variation, the only cutting or modification of the floor joists required to install the drain module 100 may be limited to cutouts formed in the webs for accommodating a drain pipe connected to the drain body 102 (see, e.g., FIG. 4B). In addition, the drain body 102 can be sized and configured to be substantially contained or located in the spacing between the floor joists in any desirable orientation. For instance, the lower portion 108 of the drain body 102 can be sized and configured to extend downwardly through the subfloor between adjacent joists supporting the subfloor.

In an embodiment, the drain trim assembly 106 can include a center portion 106A and wing portions 106B extending in opposite directions from the center portion 106A. The center portion 106A and wing portions 106B can be formed as a single member or can comprise individual parts that can be pieced together as required by the site. The center portion 106A can include an access panel 132 that is selectively removable from over the outlet 130 formed in the center portion 106A for unclogging the underlying drain pipe (e.g., snaking). For instance, the access panel 132 can fit within a corresponding seat 134 formed in the center portion 106A over a portion of the outlet 130. The access panel 132 is shown having an elongated octagon shape but can have any suitable shape.

The drain trim assembly 106 can be formed of injection molded polymer, polyester, porcelain, or other material configured to match the appearance and color of surrounding tiles. As described herein, this advantageously allows the drain trim assembly 106 to blend into a tile floor forming a wet floor area. The drain trim assembly 106 can also be configured to be cut to length with simple tile-type cuts, making the drain trim assembly 106 easily site sizeable. In an embodiment, the wing portions 106B can be cut to fit and the center portion 106A is not cut. Preferably, the wing portions 106B are each cut a same distance from the center portion 106A so that the linear drain channel 128 is at the same level on both sides of the center portion 106A. In an embodiment, the drain trim assembly 106 does not include metal surfaces that need cleaning or that may oxidize when cut.

The configuration of the drain module 100 allows it to be easily installed in many different configurations. One exemplary installation 200 of the drain module 100 according to an embodiment will now be described in reference to FIGS. 2A-2G. A step 201 can include removing a cutout 202 in a subfloor 204 and installing the drain body 102 in the cutout 202 as shown in FIG. 2A. This step can be preferably completed by a plumber. As part of the installation, the plumber can connect the outlet of the lower portion 108 of the drain body 102 to a drain pipe via a drain trap below the subfloor 204 (see FIG. 4B). In an embodiment, the drain pipe connected to the lower portion 108 of the drain body 102 can be 1½-inch diameter pipe. In other embodiments, the drain pipe connected to the lower portion 108 of the drain body 102 can be a 2-inch diameter pipe. The cutout 202 can be located against a stud of the backwall 206 and a construction plug 208 may be temporarily positioned in the opening 112.

Figure 2B:
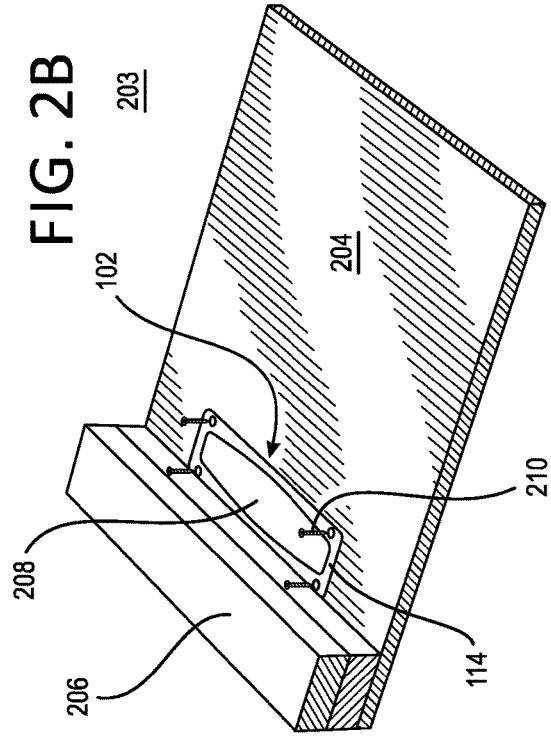
FIGS. 2A-2G illustrate installation of the floor drain system in FIG. 1 according to an embodiment.

A step 203 can include securing the drain body 102 to the subfloor via a plurality of fasteners 210 as shown in FIG. 2B. As seen, the flange 114 can support the drain body 102 in the cutout 202 on the subfloor 204 and provides an attachment surface between the drain body 102 and the subfloor 204. Once the drain body 102 is connected to the plumbing below the subfloor 204 and secured to the subfloor 204, the plumbing work associated with the drain module 100 is generally finished, and the work for the plumber is complete. The drain module 100 thus allows for a clear delineation between plumbing and tiling work required for installing the drain module 100. This beneficially streamlines installation of the drain module 100 and reduces the likelihood of installation mistakes because plumbers are not required to do tiling work, and tile installers are not required to do plumbing work.

Figure 2D:
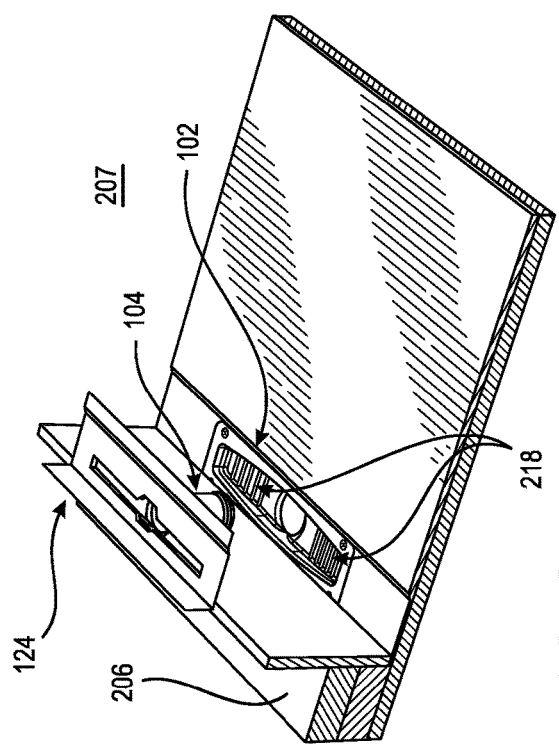
Figure 2A:
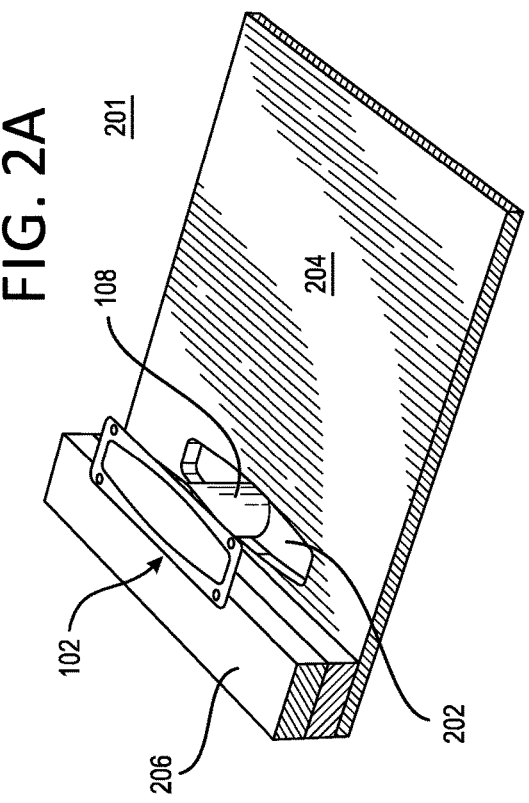
Figure 2C:
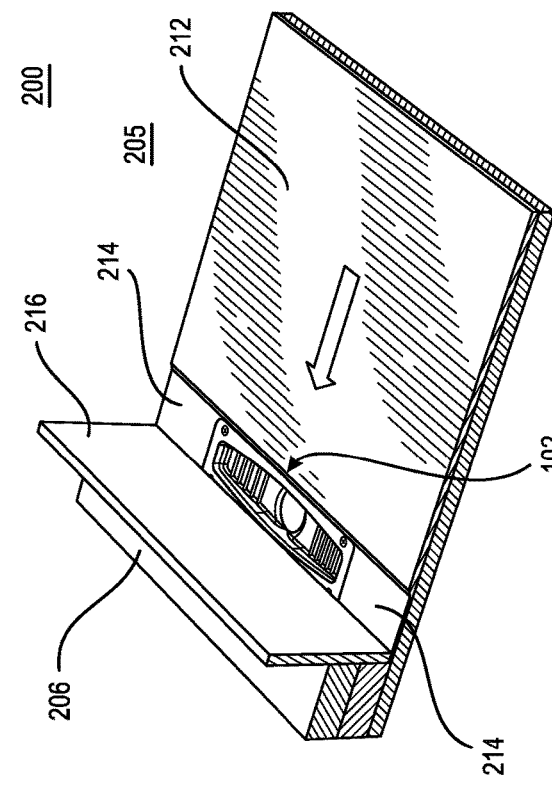

A step 205 can include installing one or more waterproof panels around the drain body 102 to form a drainage slope toward the drain module 100 as shown in FIG. 2C. Step 205 may include installing a sloping floor panel 212 forming a single slope in the floor toward the drain body 102 along a backwall 206. For example, the sloping floor panel 212 can define a ¼-inch or less drop per linear foot toward the drain body 102. Step 205 can also include installing filler panels 214 against the longitudinal ends of the drain body 102 and between the sloping floor panel 212 and the backwall 206 comprising a backwall stud. Step 205 can also include installing an upright panel 216 over the side of the drain body 102 against the backwall 206. The upright panel 216 can be installed using a sealant or other means. Step 205 may include removing the construction plug 208 from the drain body 102. This step is preferably completed by a tile installer.

A step 207 can include installing the upper drain component 104 in the drain body 102 as shown in FIG. 2D. The upper drain component 104 can be installed to a desired height relative to the drain body 102. The desired height may correspond to a final grade of the wet floor area. Step 207 can include applying an attachment material 218 such as a sealant, thinset mortar, or other material to the bottom of the opening 112 for attaching and/or supporting the upper drain component 104 after it is installed in the drain body 102. As the upper drain component 104 is installed in the drain body 102, the at least one sealing member 118 forms a seal between the upper drain component 104 and the drain body 102. This step is preferably completed by the tile installer.

Figure 2E:
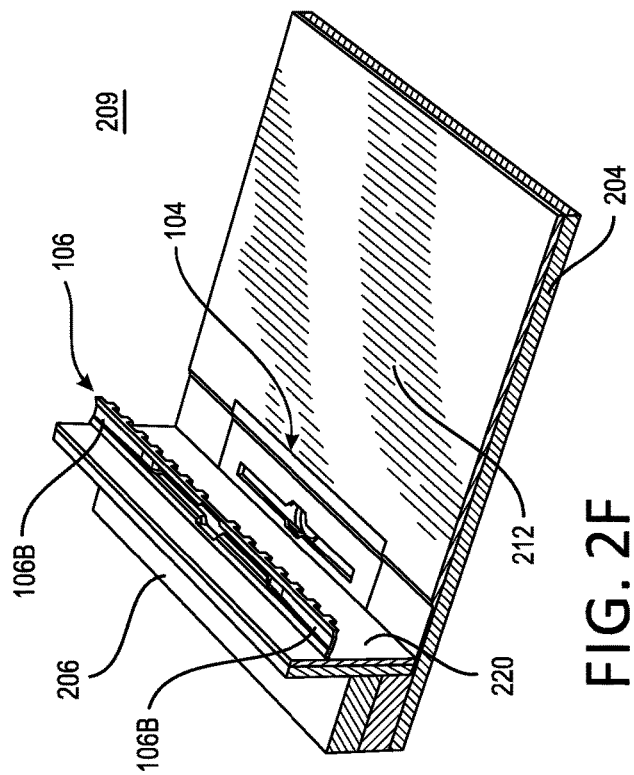

Optionally, the step 207 can include forming creases or folds in the bonding mat 124 to match or correspond to the backwall 206 and/or floor. The bonding mat 124 is shown having a preformed opening but in other embodiments an opening can be cut in the bonding mat 124 after grouting. FIG. 2E shows the upper drain component 104 installed in the drain body 102.

Figure 2F:
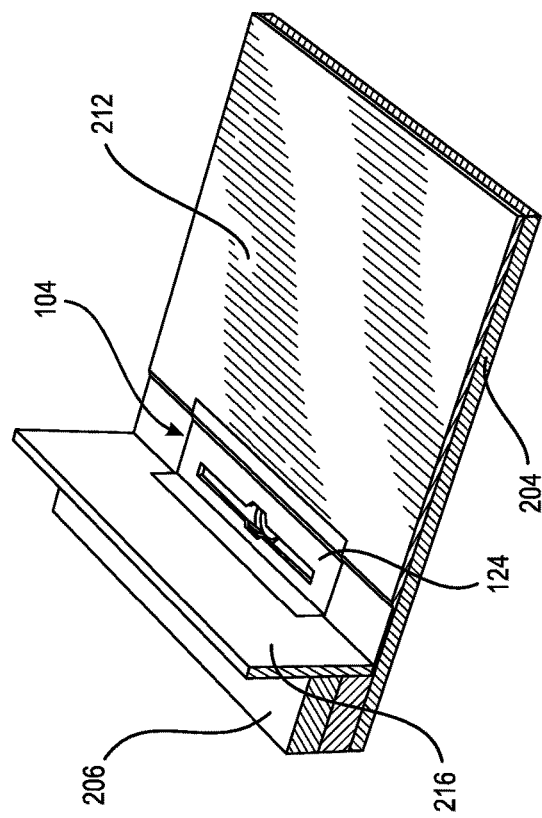
Figure 2G:
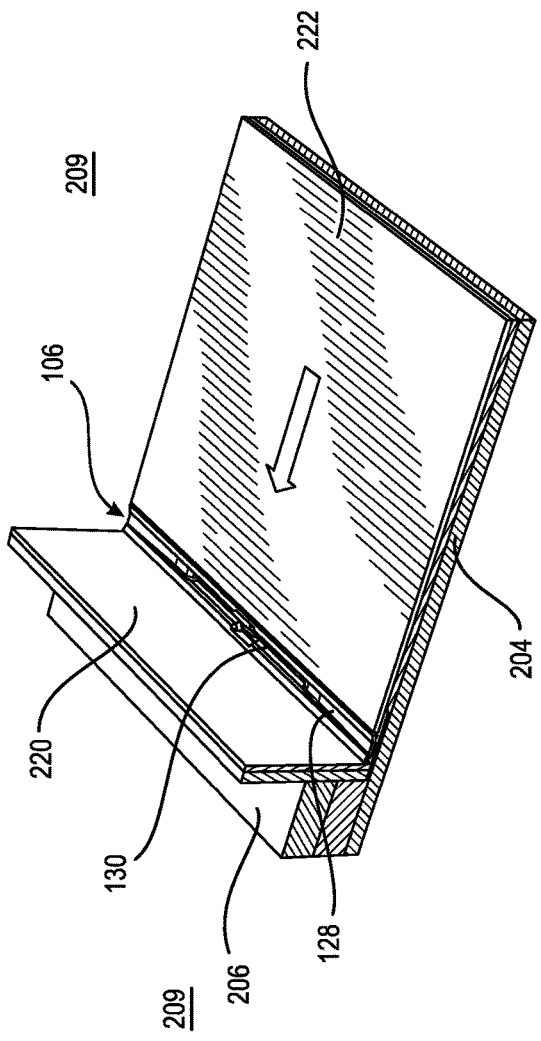

A step 209 can comprise installing the drain trim assembly 106 in a tile floor with one or more tiles using thinset mortar as shown in FIGS. 2F and 2G. The step 209 can include installing a first tile 220 against the wall and the tile floor comprising a second tile 222 on the sloping floor panel 212 using a thinset mortar. The drain trim assembly 106 can be installed over the upper drain component 104 in the thinset mortar between the first tile 220 and the second tile 222. According to a variation, the wing portions 106B of the drain trim assembly 106 can be cut as needed to fit the wet floor area. This beneficially simplifies the installation of the drain module 100 as modification of the drain trim assembly 106, including the linear drain channel 128, can be done without any required changes to the upper drain component 104 or the drain body 102, streamlining the installation process.

In use, water runs over the second tile 222 toward the backwall 206 where it enters the linear drain channel 128 of the drain trim assembly 106, which, in turn, directs the water along a length of the drain trim assembly 106 toward the outlet 130. The water then falls through the outlet 130 of the drain trim assembly 106 and into the inlet 122 of the upper drain component 104. From the upper drain component 104, it passes through the lower portion 108 of the drain body 102 and into a connected drain pipe that conveys it away from the wet floor area.

As seen in FIG. 2G, the drain trim assembly 106 can hydraulically and visually blend into the tile floor or tiled area surrounding the drain trim assembly 106. Moreover, the linear drain channel 128 is open and easily accessible in the tile floor. Further, because the drain trim assembly 106 is set in the thinset mortar attaching the tiles to the waterproof panel, the need for attachment of the drain trim assembly 106 to the upper drain component 104 is eliminated.

In addition, the linear drain channel 128 in the drain trim assembly 106 collects water on the tile floor substantially above the subfloor 204, which is not recessed for installation purposes. This advantageously allows the drain module 100 to provide more drainage with less modification or impact to the subfloor and the subfloor's supporting structure, providing a more economical and easier installation.

The drain module 100 thus advantageously provides a low-cost drainage solution that separates tile work and plumbing. It also can allow for a plurality of drain outlets to be tied or stitched together in a tile floor to achieve improved drainage with a lower slope floor and/or without an entry barrier. For instance, the floor drain system can be installed to provide multiple linear drain channels and outlets in a single sloped floor above a non-recessed subfloor.

FIG. 3A shows yet another exemplary installation of a floor drain system 300 including at least two drain modules (e.g., a first drain module 300A and a second drain module 300B) located along a backwall 305 of a tile floor comprising a wet floor area 301, and a third drain module 300C located at an entry 303 to the wet floor area 301. Like in other embodiments, a plumber can install the drain bodies of the drain modules 300A, 300B, 300C in the subfloor and connect them to drain pipes below the subfloor. A tile installer can then install one or more waterproof panels 325, 327 on the subfloor around the drain bodies and set the height of the upper drain components as needed.

Referring to FIG. 3B, the drain trim assemblies 306A, 306B, 306C can be installed with the tile floor in the wet floor area 301 using thinset mortar and grout. In an embodiment, a tile installer can install a first tile 309 comprising a single panel with grout between the third drain module 300C and the first and second drain modules 300A, 300B, providing a contemporary look. The first tile 309 can comprise a 6 mm tile or another suitable tile size. The tile installer can also install at least one second tile 311 comprising one or more large uprights panels on the backwall 305 and one or more sidewalls of the wet floor area 301. In the illustrated embodiment, the at least one second tile 311 can comprise a 6 mm tile or other tile size. The drain trim assemblies 306A, 306B of the first and second drain modules 300A, 300B collect water in the wet floor area 301. As discussed above, the drain trim assemblies 306A, 306B can collect water in the wet floor area 301 via the linear drain channels entirely located above the subfloor 315 and waterproof panel. The drain trim assembly 306C can catch water escaping through the entry 303, including water escaping through any gaps in glass 331 located at the entry 303.

Referring still to FIG. 3B, the wet floor area 301 can form a single slope toward the backwall 305 and the first and second drain modules 300A, 300B. This can provide a more desirable geometry than a design that slopes toward the entry 303. Because the first and second drain modules 300A, 300B provide multiple outlets along the backwall 305, the slope of the wet floor area 301 can be lower, more ADA friendly, and still provide flood control without an entry barrier. For instance, the wet floor area 301 can define a slope that drops about ⅛ inch per foot toward the backwall 305, more easily complying with ADA requirements.

In addition, the stitching or interconnecting of multiple drain modules along the backwall 305 of the wet floor area 301 can help placate plumbing inspectors. For instance, the first and second drain modules 300A, 300B provide redundant outlets at the backwall 305 such that if one of the drain modules 300A, 300B clogs or malfunctions, the outlet of the other drain module may still drain the wet floor area 301. Moreover, if one or both of the drain modules 300A, 300B clog or malfunction along the backwall 305, the third drain module 300C just outside or at the entry 303 provides a safety or overflow outlet that can capture overflow before it floods into the dry floor area 307, reducing the likelihood of flood damage.

The floor drain system 300 can further signal to or provide a warning to an occupant of the wet floor area 301 of a drainage problem. For example, water pooling in the linear drain channels of the first or second drain modules 300A, 300B or within the wet floor area 301 before it reaches the third drain module 300C can signal to the occupant that a drainage problem exists. In other embodiments, the wet floor area 301 can define more slope or less slope toward the backwall 305.

Use of the floor drain system 300 can also advantageously allow for a smaller sized wet floor area to help satisfy ADA requirements and/or local requirements imposed by plumbing inspectors. For example, with the first and second drain modules 300A, 300B located along the backwall 305, the wet floor area 301 can have a slope of ⅛ inch per foot and a distance from the entry 303 to the backwall 305 can be less than about 5 feet, or about 4½ feet (e.g., about 53 inches). This distance or dimension of the wet floor area 301 from the entry 303 to the backwall 305 is significantly smaller than what is typically required by a plumbing inspector to meet ADA and/or local requirements in a wet floor area with a single drain outlet.

In an embodiment, the drain trim assembly 306C of the third drain module 300C can be arranged substantially level with the wet floor area 301 at the entry 303, providing a highly accessible, barrier free wet floor area. According to a variation, the drain trim assembly 306C can be slightly raised at the entry 303 above the dry floor area 307. For instance, the drain trim assembly 306C can raise about ½ inch above the dry floor area 307. This can help provide flood control with a minimal barrier at the entry 303.

As described above, the floor drain system embodiments advantageously reduce or minimize undesirable interference with a subfloor's supporting structure compared to prior art systems. As seen in FIG. 3C, a first drain body 302A of the first drain module 300A and a drain body 302C of the third drain module 300C can be installed through the subfloor 315 and positioned on opposite sides of a floor joist 317 without cutting or otherwise modifying an upper cord 319 of the floor joist 317, simplifying and streamlining installation. Further, first and second drain modules 300A, 300B can drain the wet floor area 301 on both sides of the floor joist 317 without cutting or otherwise modifying the upper cord 319. It can thus be appreciated that the floor drain system 300 advantageously ties or stitches together the drain modules within the wet floor area 301 and around the floor joists in such a way that simplifies installation and minimizes modification to the joists or subfloor.

FIG. 3D is a cross section view of the drain module 300C according to an embodiment. As seen, the drain body 302C and the upper drain component 304C can be installed in the subfloor 315 and substantially tucked or hidden between the floor joists below the first tile 309. The drain body 302C can be installable in the subfloor 315 so that the lower portion 308C is located alongside a floor joist 321. The flange 314C of the upper portion 310C can support the drain body 302C on the upper surface of the subfloor 315. The upper portion 310C can be dimensioned so that a longitudinal end part of the upper portion 310C can extend over a chord 323 of the floor joist 317 and below the tile. As previously described, the upper drain component 304C is positioned and vertically adjustable in the opening of the drain body 302C. A sealant or thinset mortar can be applied to a bottom of the opening for supporting the upper drain component 304C after it is installed in the drain body 302C. The bottom of the opening can define a plurality of elongate protrusions configured to help prevent the sealant or thinset mortar from moving within the opening after it is set.

Like in other embodiments, the drain trim assembly 306C can be installed with the tile floor over the drain body 302C without attachment to the upper drain component 304C or the drain body 302C. The drain trim assembly 306C can be also be installed without interfacing with an opening of the drain body 302C and/or the inlet of the upper drain component 304C. The drain trim assembly 306C can thus collect water in the tile floor comprising the wet floor area 301 via its linear drain channel that is located entirely above the subfloor 315 and the one or more waterproof panels 325. As such, there is no need to recess the subfloor 315 or recess the drain trim assembly 306C in the subfloor 315. The floor drain system 300 beneficially collects water in the tile floor entirely above the subfloor and prevents flooding, helping to minimize the impact of its components below the subfloor 315.

According to a variation, a debris trap may be included with the floor drain system embodiments. For example, a debris trap 322 can be associated with the access panel 332C in the drain trim assembly 306C. The debris trap 322 can include one or more prongs that resiliently secure the debris trap 322 within an internal channel of the lower portion 316C of the upper drain component 304C and catch hair and other debris that enter the drain module 300C before it reaches the outlet of the drain module 300C. This helps in keeping the drain module 300C clean as the debris trap 322 can be conveniently accessed and removed via the access panel 332C. Further, the debris trap 322 can do so without interrupting the visual appeal or appearance of the drain trim assembly 306C as the debris trap 322 is hidden within the upper drain component 304C. It also makes cleaning and/or clogging of the drain module 300C less frequent and improves flow performance.

In an embodiment, the debris trap 322 may include a head that threadedly attaches to the underside of the access panel 332C and a shaft portion extending between the prongs and the head portion. In other embodiments, the debris trap 322 can be omitted.

FIGS. 4A-4C illustrate an installation of a floor drain system 400 according to yet another embodiment. The floor drain system 400 is similar to the floor drain system 300 except that the wet floor area 401 is constructed with a plurality of large format tiles 412 and the floor drain system 400 includes first and second drain modules 400A, 400B tied or stitched together at a backwall 405 and third and fourth drain modules 400C, 400D tied or stitched together at an entry 403 to the wet floor area 401.

The first and second drain modules 400A, 400B thus provide two outlets at the backwall 405 and the third and fourth drain modules 400C, 400D provide two outlets in the dry floor area 407 just outside the entry 403. As described above, these multiple outlets provided by the floor drain system 400 beneficially allow for the wet floor area 401 to define a lower, more ADA friendly slope and flood control with no or a minimal entry barrier. In an embodiment, the wet floor area 401 may slope only ⅛ inch per foot or another desirable slope.

Moreover, the floor drain system 400 can be arranged to do so without undesirable and costly interference with the subfloor's supporting structure. Referring to FIGS. 4B and 4C, the drain bodies 402A, 402B, 402C, 402D of the floor drain system 400 extend in a downward direction through the subfloor 415 between adjacent joists 417. The drain bodies 402A, 402B, 402C, 402D can be dimensioned and configured to have a low profile and to fit within common spacings between adjacent joists 417. For instance, a lower portion of at least one of the drain bodies 402A, 402B, 402C, 402D can be sized and configured to extend downwardly through the subfloor 415 between adjacent joists 417 supporting the subfloor 415.

According to a variation, a longitudinal end part of the upper portion on at least one of the drain bodies can extend over an upper chord 419 of a joist 417 without physically cutting into the upper chord 419. This advantageously helps maintain the structural integrity of the joists 417 and allows the drain bodies to be installed in the subfloor 415 in a direction traversing the joists 417 if desired unlike prior art line drain systems.

Each of the drain bodies 402A, 402B, 402C, 402D can be attached to a trap 421 located alongside a joist 417 or between adjacent joists 417, which, in turn, is attached to a drain pipe 423 extending through one or more cutouts in a web 425 of the joists 417. The web 425 extends between the upper chord 419 and a lower chord 427 of the joist 417. It will be appreciated that the traps 421 and drain pipes 423 can have different sizes based on the site or plumbing requirements. For instance, the traps 421 and the drain pipes 423 can be 1½-inch diameter or 2-inch diameter.

The floor drain system 400 thus can use multiple drain modules tied or stitched together to collect water in the wet floor area 401 and prevent flooding, all in a space substantially entirely above the subfloor, to help minimize the impact of its components below the subfloor 415 as demonstrated above.

FIG. 5 illustrates a drain trim assembly 506 according to an embodiment in greater detail. The drain trim assembly 506 includes a center portion 506A, and a pair of wing portions 506B extending longitudinally from the center portion 506A. The drain trim assembly 506 defines a longitudinal length L extending between opposite longitudinal ends 538 of the wing portions 506B. The drain trim assembly 506 defines a linear drain channel 528 that slopes along the length L of the drain trim assembly 506 and is intercepted by an outlet 530. The linear drain channel 528 may not include a cover so that it is open to and easily accessible in a tile floor. As seen, the linear drain channel 528 is such that it generally does not include any concealed fouling surfaces and is easily cleanable. In an embodiment, the linear drain channel 528 defines a width that tapers in a direction away from the longitudinal ends of the drain trim assembly 506 toward the outlet 530. The outlet 530 can have an elongate configuration. For instance, the outlet 530 can define about a 9-inch length, and about ¼" width.

As discussed above, the drain trim assembly 506 can be formed of injection molded polymer, polyester, porcelain, or other material configured to match or correspond to the appearance and/or color of surrounding tiles, which, in turn, allows the drain trim assembly 506 to blend into the tiles from the wet floor area. The drain trim assembly 506 also may not include any metal surfaces that need cleaning or that will oxidize when cut.

The material properties and appearance of the drain trim assembly 506 also allow the length L of the drain trim assembly 506 to be adjusted or varied as needed. For instance, the drain trim assembly 506 can be selectively shortened via field cutting thereby moving the longitudinal ends 538 from a first position to a second position, the second position being closer to the outlet 530. Consequently, the drain trim assembly 506 can be cut to precise lengths as needed. In an embodiment, the longitudinal ends 538 are cut at the same location relative to the center portion 506A, which, in turn, keeps the longitudinal ends 538 at the same or substantially the same level.

It will be appreciated that the drain trim assembly 506 can also be effectively lengthened by joining it with other drain trim assemblies of other drain modules via grout or other material applied between the respective longitudinal ends.

An access panel 532 is selectively removable from over the outlet 530. The access panel 532 can be removably positioned in a seat 534 defined in the center portion 506A. The access panel 532 is configured for removal to unclog the underlying drain pipe or accessing a debris trap. In an embodiment, the access panel 532 defines a raised surface 537 having a flattened configuration with two planar surfaces 539 sloping toward the outlet 530 from the raised surface 537, which, in turn, helps direct water falling onto the access panel 532 into the outlet 530. As seen, the access panel 532 is significantly shorter than the outlet 530 so that water can flow into the outlet 530 from the linear drain channel 528 on both sides of the access panel 532. Optionally, the center portion 506A includes one or more breakaway tabs 536 that help accommodate internal stresses within the center portion 506A during manufacturing.

According to a variation, a bottom surface 540 of the drain trim assembly 506 can include alternating supports 542 and recesses 544 extending through a width of the drain trim assembly 506. This beneficially helps capture thinset mortar and/or grout when the drain trim assembly 506 in installed with the tiles. For example, the thinset mortar can be captured within the recesses 544 between the supports 542, which, in turn, helps the thinset mortar or other material to more effectively bridge between the drain trim assembly 506 and the surrounding tiles. It also helps thinset mortar and/or grout from migrating along the length L of the drain trim assembly 506.

FIG. 6 illustrates yet another embodiment of a drain trim assembly 606 that is segmented or separated into a center portion 606A and wing portions 606B. The portions 606A, 606B can have any length and width. For instance, at least one of the portions 606A, 606B can have a length of about 10 inches and a width of about 1¼ inches.

Optionally, the drain trim assembly 606 can be combined with drain trim assemblies 706, 806 of other drain modules to stitch or tie together a larger system in a tile floor (wet or dry). For example, the drain trim assemblies 606, 706, and 806 can extend about 8 feet from end to end and provide three drain outlets in a wet floor area. In other embodiments, the drain trim assemblies can extend a greater or shorter distance.

FIG. 7 illustrates yet another embodiment of a floor drain system 900 installed in a low or no slope wet floor area. The floor drain system 900 includes a plurality of drain modules installed around a perimeter of a flat center panel 901 and comprising a first drain module 900A, a second drain module 900B, a third drain module 900C, and a fourth drain module 900D. A plurality of sloped side panels 903 are installed outside of the drain modules 900A, 900B, 900C, 900D so that the drain modules are located between the sloped side panels 903 and the flat center panel 901. The sloped side panels 903 fit together and slope toward at least one of the drain modules 900A, 900B, 900C, 900D. The flat center panel 901 and the sloped side panels can comprise tile members or any other suitable material.

Like in other embodiments, the drain modules 900A, 900B, 900C, 900D can be installed with significant ease and minimal interference of a subfloor's supporting system. Moreover, the drain bodies can be installed by a plumber and the upper drain components and drain trim assemblies of the floor drain system 900 can all be installed by a tile installer without assistance of the plumber, reducing the likelihood of installation mistakes.

In use, water falling on the flat center panel 901 can spread or sheet flow outward where it is captured or collected by at least one of the drain modules 900A, 900B, 900C, 900D. If water falls on one or more of the sloped side panels 903 it be directed toward one of the drain modules 900A, 900B, 900C, 900D by the sloped side panels, where it is collected and transported away. Because the drain modules 900A, 900B, 900C, 900D are redundant or provide safety outlets, the floor drain system 900 offers flood control. For instance, if one of the drain modules 900A, 900B, 900C, 900D malfunctions, at least one of the other drain modules 900A, 900B, 900C, 900D can drain water from the flat center panel 901. Moreover, if all the drain modules 900A, 900B, 900C, 900D malfunction or fail, the floor drain system 900 causes water to pool to a depth on the flat center panel 901 before escaping over the upper, outer ends of the sloped side panels 903, providing a flood warning to an occupant and flood control without an entry barrier.

While the floor drain system embodiments have been shown and described as being installed in a wood floor, it will be appreciated that in other embodiments the floor drain system can be used or installed with a concrete or cast in place floor. FIGS. 8-9 illustrate a floor drain system 1000 according to yet another embodiment. The floor drain system 1000 can be like other embodiments except that is configured for installation in a cast-in-place floor. As shown in FIG. 8, the floor drain system 1000 can include a plurality of drain modules 1000A, 1000B, 1000C, and 1000D, each including a drain body, an upper drain component, and a drain trim assembly as described above.

The floor drain modules 1000A, 1000B, 1000C, and 1000D can each be coupled to a collar member 1052, which, in turn, is attached to an angle member 1054 tying the floor drain modules 1000A, 1000B, 1000C, and 1000D together. The angle member 1054 can receive a plurality of anchors or threaded rods 1056 that in combination with the angle member 1054 are configured to set and maintain the position of the floor drain modules 1000A, 1000B, 1000C, and 1000D within a concrete floor that is cast-in place. The floor drain modules 1000A, 1000B, 1000C, and 1000D may also be pre-connected to plumbing such as traps 1058 and drain pipes 1060 as shown before the floor is cast. The floor drain system 1000 can thus be easily modified to be compatible with both wood floor installations and concrete floor installations.

FIGS. 9A-9E illustrate an installation of the floor drain system 1000 for inclusion in a cast-in-place floor according to an embodiment. Any or all of the following steps may be performed by a plumber or other individual. A step 1001 can include preparing the angle member 1054. The angle member 1054 can comprise an angle iron including a horizontal section and vertical section. For instance, the angle member 1054 can comprise an angle iron having 1½ inch by ⅛-inch angle iron. The step 1001 can include cutting the angle member 1054 to length and drilling one or more holes 1062 for the threaded rods 1056 in the horizontal section. The step 1001 can include creating one or more marks 1064 on the angle member 1054 for marking the position or positions of the drain modules 1000A, 1000B, 1000C, 1000D.

A step 1003 can include attaching a collar member 1052 to the angle member 1054. The step 1003 can include aligning an indicator 1066 comprising an alignment tab formed in the collar member 1052 with the mark 1064 on the angle member 1054. The step 1003 can include attaching the collar member 1052 to the angle member 1054 with one or more fasteners 1068. In an embodiment, the collar member 1052 can include a central opening 1070 and a pair of cylinders or barrels 1072 defining threaded through holes that extend in a traverse direction relative to the central opening 1070 along the outer surface of the collar member 1052. The central opening 1070 can extend entirely through the collar member 1052.

An end of the barrels 1072 can engage with and support the collar member 1052 on the vertical section of the angle member 1054. The one or more fasteners 1068 can comprise screws that self-drill and tap into the angle member 1054. The step 1003 can include attaching the threaded rod 1056 to the angle member 1054 via the one or more holes 1062. According to an embodiment, the underside of the barrels 1072 include at least one fin member 1078 configured to engage with an underside of the angle member 1054 when the collar member 1052 is properly positioned against the angle member 1054. The at least one fin member 1078, in combination with the indicator 1066, can help ensure proper positioning of the collar member 1052 on the angle member 1054.

A step 1005 can include inserting the drain body 1002 in the collar member 1052 as shown in FIG. 9C. In an embodiment, the top end of the central opening 1070 can include a counterbore portion defining a pair of recesses 1074 (shown in FIG. 9C) and the underside of the upper portion 1010 includes a pair of lugs 1076 toward the lower portion 1008 (shown in FIG. 9D). The recesses 1074 and the lugs 1076 are configured so that when the lugs 1076 are located within the recesses 1074 the drain body 1002 is substantially in line with the angle member 1054. The step 1005 can include attaching the drain body 1002 to the collar member 1052 via an adhesive. The collar member 1052 can be formed of ABS and the adhesive can comprise ABS pipe cement. The different drain bodies are fully engaged with the collar members when they are at the same level and in line with the angle member 1054. According to a variation, the drain bodies can be attached or pre-attached to plumbing before the floor is poured or cast-in-place. The drain body 1002 can include a temporary construction plug 1080 comprising a protective paper. Floor drain systems of the present disclosure can thus be installed in wood or concrete subfloors.

Figure 10:
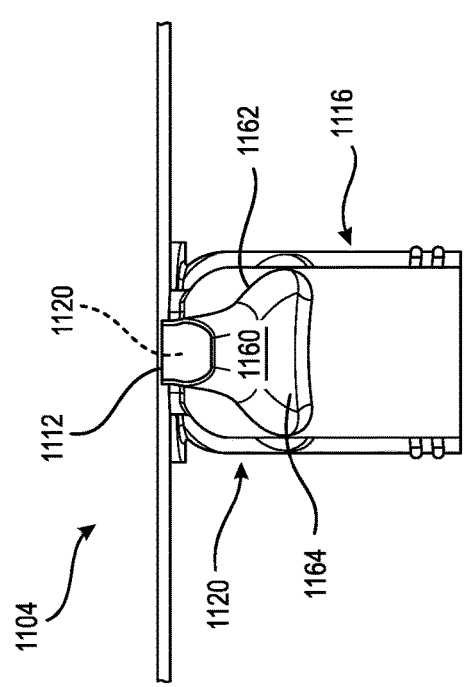
FIG. 10 is a cross section view of an upper drain component according to an embodiment.

FIG. 10 is a cross section of an upper drain component comprising a drain riser 1104 according to an embodiment. The drain riser 1104 can include the same or similar features of the drain risers describe above. As shown, an upper portion 1120 of the drain riser 1104 defines an internal cavity 1160 connecting the inlet 1112 and a lower opening or outlet in the lower portion 1116. The internal cavity 1160 can have sidewalls 1162 that widen or run outward from the inlet 1112 before connecting to a bottom 1164 of the internal cavity 1160, which is intercepted by the lower portion 1116. For instance, the internal cavity 1160 can have a c-shape cross section. This can help increase the hydraulic capacity of the drain riser 1104 as water enters through the inlet 1112, improving the drainage performance of the drain module.

Figure 11A:
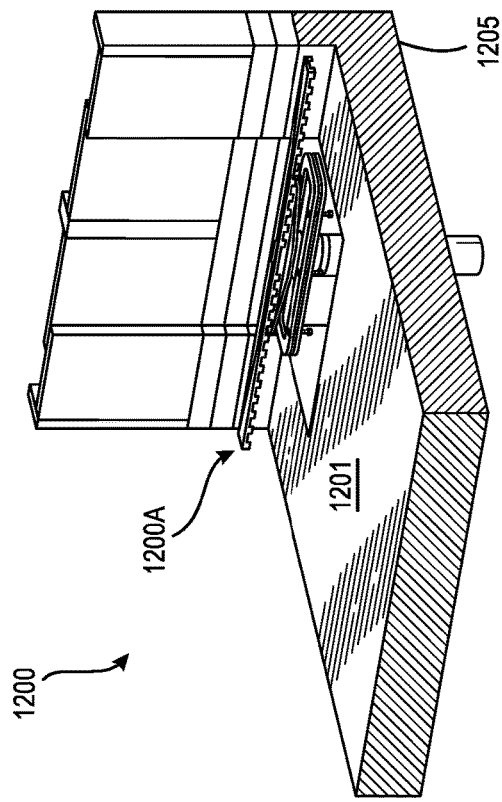
FIGS. 11A-11C illustrate installation of a floor drain system according to another embodiment.
Figure 11C:
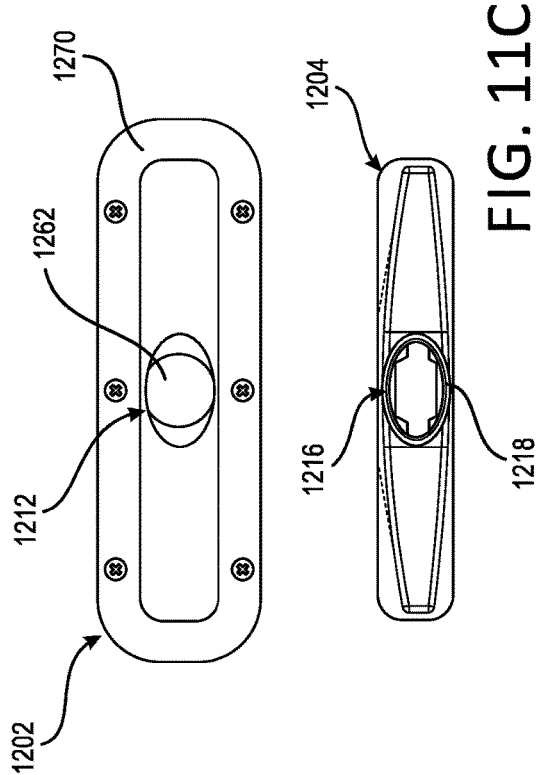
Figure 11B:
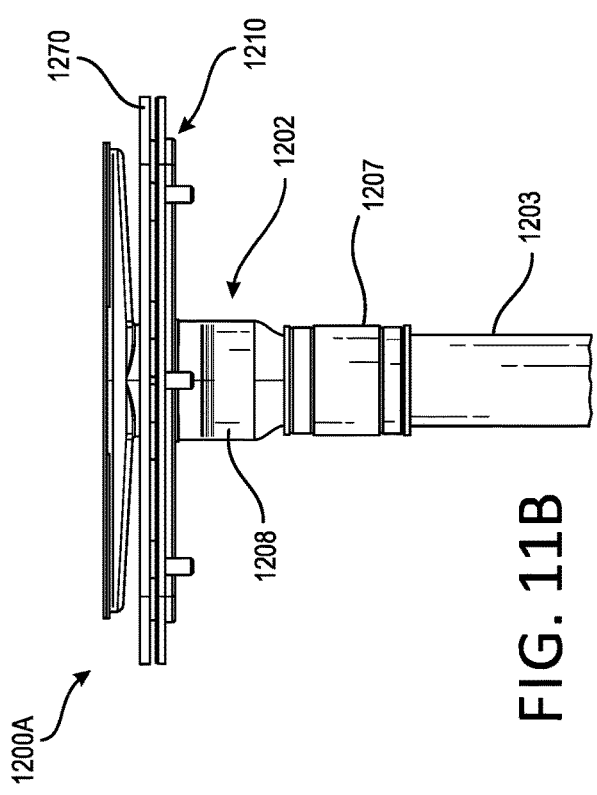

FIGS. 11A-11C illustrate a floor drain system 1200 installed in a concrete floor 1201 according to yet another embodiment. As seen, the floor drain system 1200 can include a drain module 1200A including the same or similar features as the other embodiments. The drain module 1200A can be positioned at or substantially adjacent a backwall 1205. In an embodiment, existing concrete is removed from the concrete floor 1201 around the drain pipe 1203 and the drain module 1200A can be installed generally as described above.

Referring to FIG. 11B, the drain module 1200A includes a drain body 1202 including a lower portion 1208 defining an outlet and configured to connect to a drain pipe 1203 and an upper portion 1210 defining a opening 1212 configured to receive an upper drain component comprising a drain riser 1204. The lower portion 1208 has a diameter that is reduced toward a lower end of the lower portion 1208. This beneficially can help in attachment of the drain body 1202 to a smaller sized drain pipe.

In an embodiment, the lower portion 1008 can attach to the drain pipe 1203 via a compression fitting 1207 as shown in FIG. 11B. The cylindrical shape of the lower portion 1208 of the drain body 1202 allows it to more easily attach to a drain pipe (which are generally circular). The upper portion 1210 has a low profile or reduced height and carries a clamping plate 1270 configured for clamping an impermeable membrane or sheet to the upper surface of the drain body 1202, helping to waterproof the drain module 1200A or install the drain module 1200A using a hot mopping application.

Referring to FIG. 11C, the opening 1212 can comprise an attachment opening 1262 in the upper portion 1210 having a shape that is configured to receive a lower portion 1216 of the drain riser 1204 having a corresponding shape. In the illustrated embodiment, the attachment opening 1262 and the lower portion 1216 can have an oval shape or elliptical shape. This arrangement can help increase the flow capacity of the drain body 1202 and the drain riser 1204 within a smaller footprint. For instance, the oval shape of the attachment opening 1262 provides a larger inlet/outlet area than a circular opening having a same minor diameter as the oval opening, which, in turn, allows more water to flow through the drain riser 1204 and the attachment opening 1262. This allows the overall width of the drain body 1202 and the drain riser 1204 to be smaller because there is no need to increase their overall widths to accommodate a larger circular opening. As such, the drain module 1200A can function with larger drain pipes (e.g., 2-inch pipes) while using smaller drain bodies and risers. This beneficially helps in locating the drain module 1200A as close as possible to the backwall 206.

Like in other embodiments, an outer surface of the lower portion 1216 on the drain riser 1204 can carry one or more sealing members 1218 arranged to form a watertight seal between the drain riser 1204 and the drain body 1202. In the illustrated embodiment, the one or more sealing members 1218 can have an oval ring shape.

Figure 13:
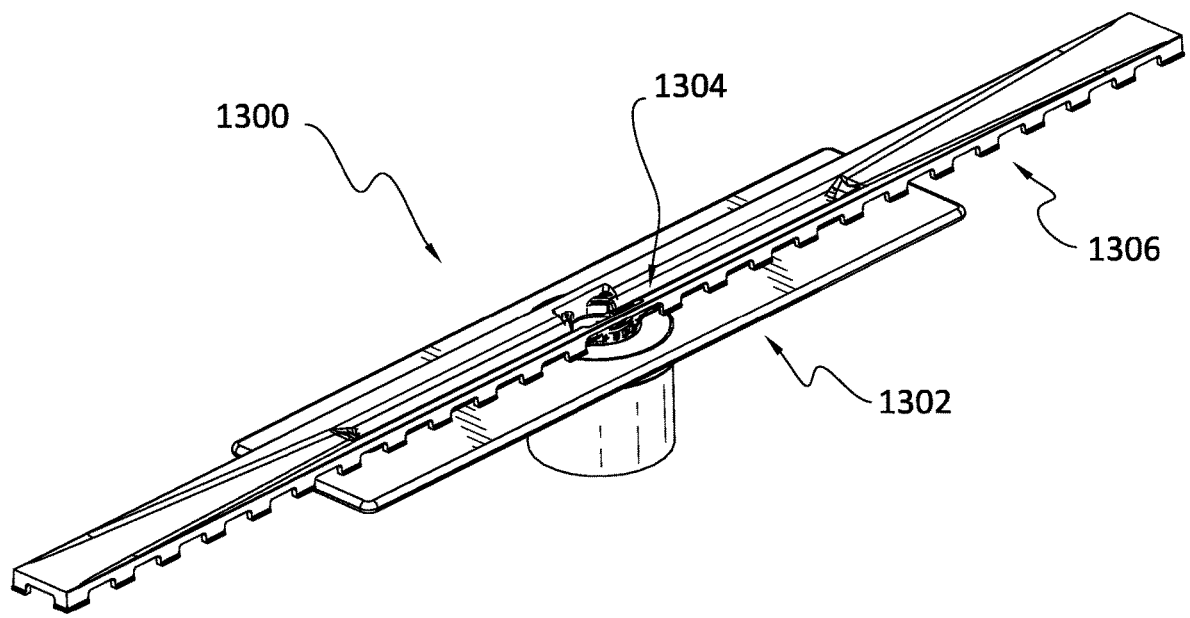
FIG. 13 is a perspective view of the floor drain system in FIG. 12.

FIGS. 12-16 illustrate a floor drain system comprising a drain module 1300 according to another embodiment. As shown in FIG. 12, the drain module 1300 can include a drain body 1302, an upper drain component 1304, and a drain trim assembly 1306. When assembled, the upper drain component 1304 can be installed on the drain body 1302 and the drain trim assembly 1306 can be positioned on the drain body 1302 over the upper drain component 1304 as shown in FIG. 13. It will be appreciated that the drain trim assembly 1306 can be the same or like the other drain trim assembly embodiments. For instance, the drain trim assembly 1306 can comprise a linear drain defining a linear drain channel 1328 that slopes along a length of the drain trim assembly 1306 and is intercepted by an outlet 1330. In some embodiments, the drain module 1300 can be installed in a tile floor without the drain trim assembly 1306.

Figure 14:
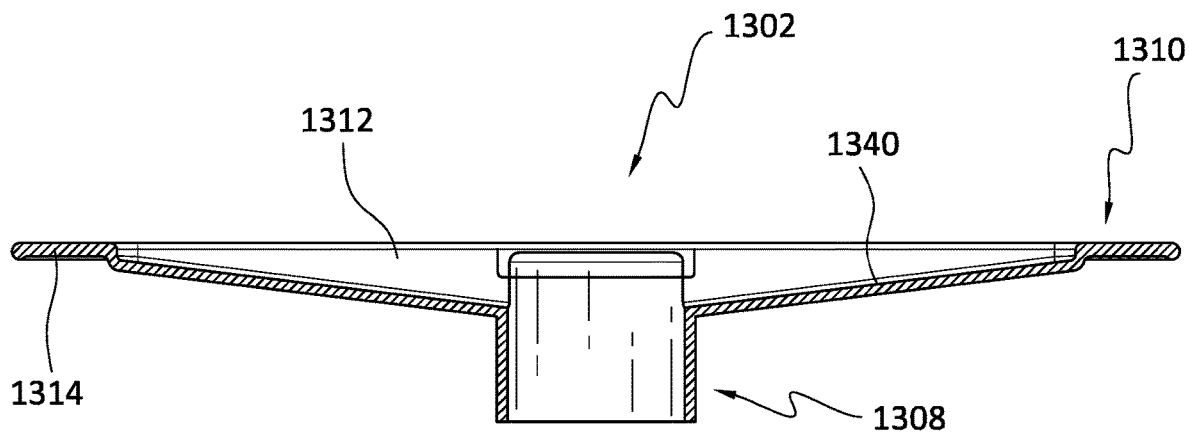
FIG. 14 is a cross section view of the drain body in FIG. 12.

Referring to FIGS. 12-14, the drain body 1302 can be configured to be installed in a subfloor and includes a lower portion 1308 defining an outlet and configured to mate with a plumbing system or a drain pipe, and an upper portion 1310 defining an opening 1312 sized and configured to receive at least a lower portion of the upper drain component 1304 therein. According to an embodiment, an outer peripheral shape of the opening 1312 generally corresponds to the outer peripheral shape of the upper drain component 1304 so that at least a portion of the upper drain component 1304 fits in the opening 1312 in a close-fitting manner. For instance, each of the opening 1312 and the upper drain component 1304 can include an outer peripheral shape including parallel side portions, curved end portions, and a circular or oval center portion.

Like in other embodiments, the upper portion 1310 defines a flange 1314 extending around the opening 1312 that can support and provide a connection area between the drain body 1302 and the subfloor or a substrate. For instance, an underside of the flange 1314 can support the drain body 1302 on and be attached to the subfloor via thinset mortar material or other means. The flange 1314 can define a width U. The width U at least in part can help form a clearance between a backwall in a floor area and an inlet of the drain module 1300. This can allow the drain body 1302 to sit closer against the backwall while providing enough room for the drain pipe below the subfloor to be attached to the lower portion 1308. According to an embodiment, the width U can vary between the sides of the drain body 1302. An upper surface 1342 of the upper portion 1310 is substantially planar but can have any suitable configuration. It will be appreciated that the upper surface 1342 can be arranged to support the drain trim assembly 1306 thereon.

According to an embodiment, the drain module 1300 is configured for surface waterproofing applications. For instance, the upper surface 1342 of the drain body 1302 can include one or more features configured to help adhere a waterproofing membrane to the upper surface 1342. In other embodiments, the upper surface 1342 can include one or more features configured to help retain mortar material between the drain trim assembly 1306 and the drain body 1302. As best shown in FIG. 14, the opening 1312 can comprise an inlet in fluid communication with a linear drain channel 1340 (shown in FIG. 14) that slopes along a length of the drain body 1302 toward the lower portion 1308.

The upper drain component 1304 will now be described in additional detail in reference to FIG. 15, which is a cross section of the drain body 1302 installed in a subfloor 1301 with the upper drain component 1304 inserted in the opening 1312. The upper drain component 1304 is configured to receive and convey water from a floor area (e.g., wet floor area). As shown, the upper drain component 1304 comprises a body having elongate configuration including a base portion 1344 and a wall portion 1346 projecting upward from the base portion 1344. The base portion 1344 can be configured to extend into the opening 1312 and selectively engage with a bottom of the linear drain channel 1340. The base portion 1344 can be configured to support on, but do not attach to the upper drain component 1304 to the drain body 1302.

The wall portion 1346 can be configured to extend above the drain body 1302 and to help minimize the profile of the upper drain component 1304 in an installation. For instance, the wall portion 1346 defines a slotted inlet 1348 along a length of the body that when positioned on the drain body 1302 is in fluid communication with the opening 1312. The slotted inlet 1348 can extend along substantially all the length of the body. In other embodiments, the slotted inlet 1348 can extend along less than all the length of the body. The wall portion 1346 can have a reduced thickness extending around the slotted inlet 1348. Optionally, the upper drain component 1304 can include an access cover 1350 removable from the upper drain component 1304 over the lower portion 1308 of the drain body 1302 for unclogging or accessing the underlying drain pipe. For instance, the access cover 1350 can fit within a corresponding seat formed in the slotted inlet 1348 over the lower portion 1308 of the drain body 1302. The access cover 1350 is shown having a circular shape but can have any suitable shape. According to a variation, a debris trap similar to the debris trap embodiments discussed above can be associated with the access cover 1350. The debris trap can be configured to catch hair and other debris that enters the drain module 1300 before it reaches the outlet of the drain body 1302.

In an embodiment, the slotted inlet 1348 can define a width M selected to help the upper drain component 1304 reduce its profile and blend into an installation. For instance, the width M of the slotted inlet 1348 can be between about ⅛ inch and about ½ inch (e.g., about ¼ inch). In other embodiments, the width M can be larger or smaller. This in combination with the overall reduced profile of the upper drain component 1304 beneficially can help minimize interruption caused by the upper drain component 1304 in an installation (e.g., a mosaic tile floor).

Figure 15:
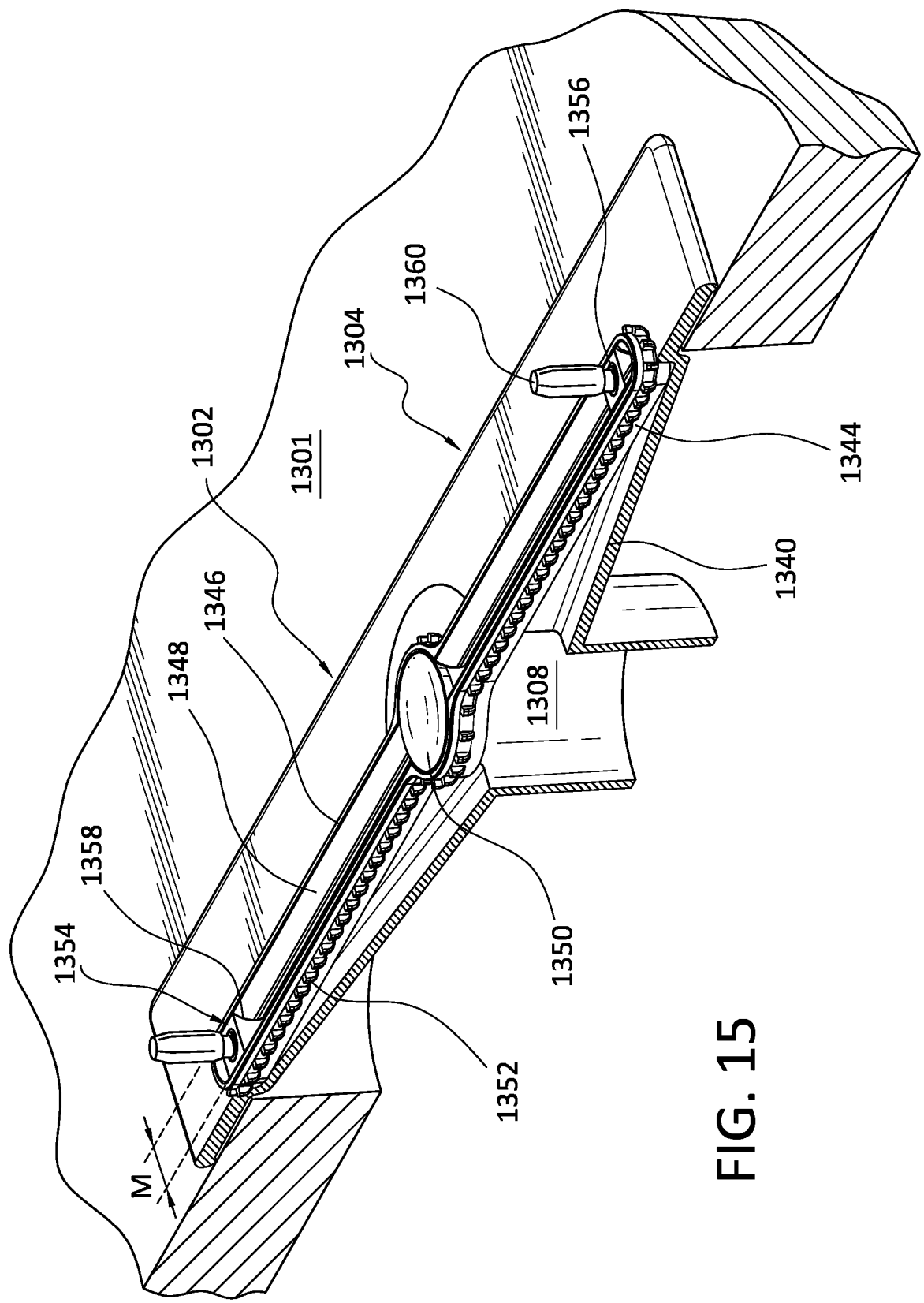
FIG. 15 illustrates installation of the drain body and the upper drain component in FIG. 12.

Referring still to FIG. 15, the upper drain component 1304 can define a plurality of spacer elements 1352 distributed around the outer perimeter of the wall portion 1346. If the drain module 1300 is installed in a tile floor without the drain trim assembly 1306, the spacer elements 1352 are sized and configured to help set a gap between the upper drain component 1304 and one or more tiles that may be installed around the upper drain component 1304. This beneficially helps align or position the upper drain component 1304 with grout lines intercepting the drain module 1300. The spacer elements 1352 can have any suitable shape and can engage with surrounding tiles and be embedded within grout or mortar material. If the drain module 1300 is installed in a tile floor with the drain trim assembly 1306, the spacer elements 1352 can help align the drain trim assembly 1306 on the upper drain component 1304.

Like in other embodiments, the upper drain component 1304 can be adjustable in vertical position relative to the drain body 1302. It can also be adjustable in angle and/or pitch relative to the drain body 1302. For instance, one or more inserts 1354 including threaded holes 1356 can be selectively coupled to the upper drain component 1304. The one or more inserts 1354 can be inserted into the slotted inlet 1348 through the space for the access cover 1350. According to a variation, the one or more inserts 1354 can have concave side surfaces 1358 arranged to interface with convex side surfaces of the slotted inlet 1348 so that the one or more inserts 1354 can slide along the length of the slotted inlet 1348 but vertical movement between the one or more inserts 1354 and the upper drain component 1304 is prevented or substantially prevented except in the space for receiving the access cover 1350. The one or more inserts 1354 can thus be inserted through the space for the access cover 1350 and then slid along the slotted inlet 1348 toward the longitudinal ends of the upper drain component 1304. It will be appreciated that the interaction between the one or more inserts 1354 and the slotted inlet 1348 can be any suitable interaction that couples the one or more inserts 1354 and the upper drain component 1304 to selectively prevent or limit vertical relative movement therebetween.

In an embodiment, the threaded holes 1356 can receive one or more set screws 1360 having lower ends arranged to engage a bottom of the linear drain channel 1340. The one or more set screws 1360 can be arranged to support on, but do not attach the upper drain component 1304 to the drain body 1302. The one or more set screws 1360 are sufficiently rigid such that they at least in part support the upper drain component 1304 on the drain body 1302. They can thus provide stability at the level they are set to until mortar surrounding the upper drain component 1304 solidifies or hardens. The one or more set screws 1360 can be rotated in the threaded holes 1356 to raise and/or lower the upper drain component 1304 relative to the drain body 1302. The one or more set screws 1360 can include a portion having a hexagonal cross section such that a socket or other tool can be used to rotate the one or more set screws 1360. In other embodiments, the one or more set screws 1360 can include a winged shaped head so that the one or more set screws 1360 can be rotated manually with the fingers.

As described above, the drain trim assembly 1306 can be adapted to be tiled and grouted in place with tiles forming a floor area with the outlet 1330 positioned over the upper drain component 1304, and the opening 1312 of the drain body 1302. This advantageously helps to separate the plumbing associated with the installation of the drain body 1302 from the tile work associated with the installation of the upper drain component 1304 and the drain trim assembly 1306.

Figure 16:
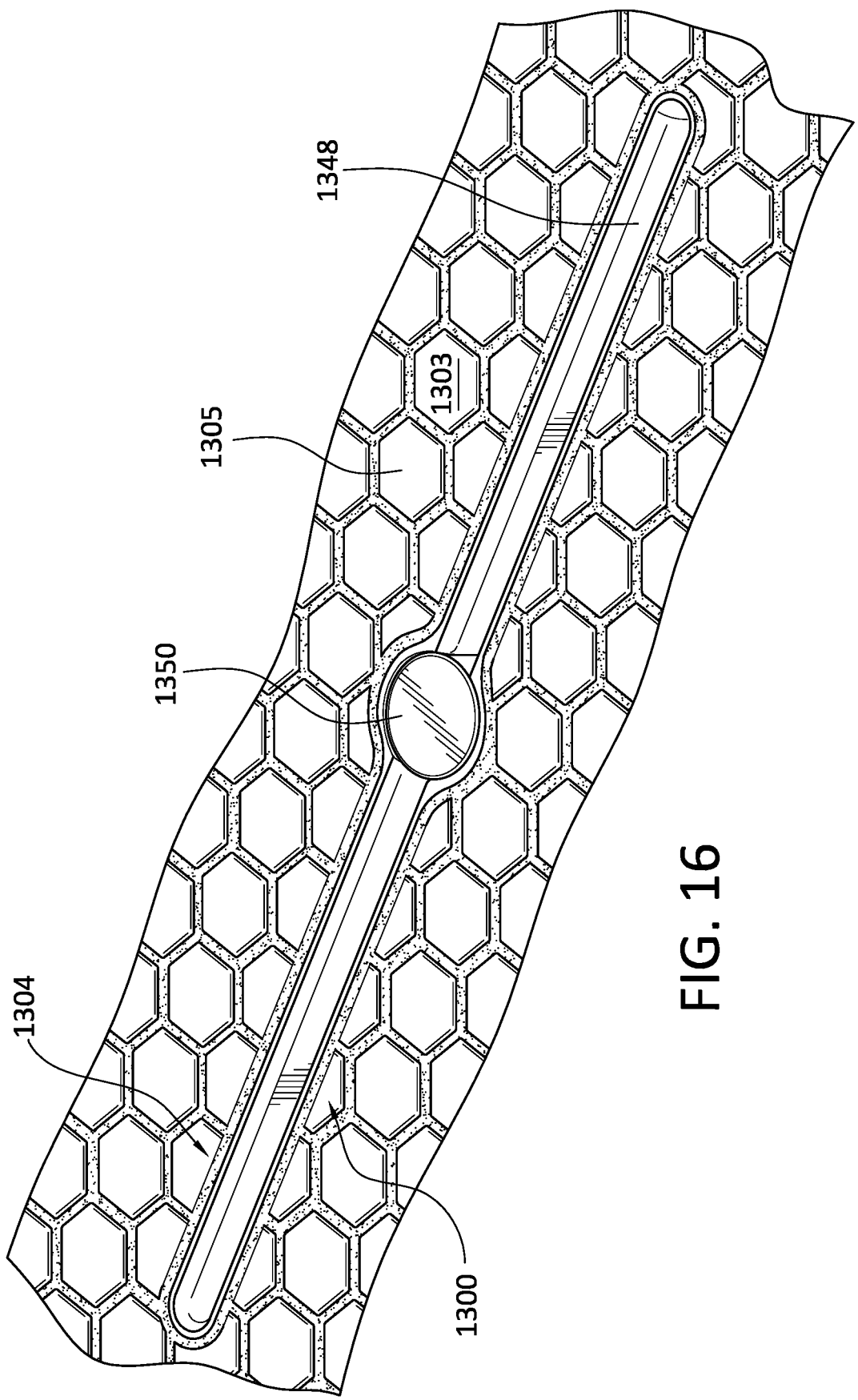
FIG. 16 illustrates installation of the floor drain system in FIG. 12 in a tile floor.

As noted above, the drain module 1300 can be installed in a tile floor without the drain trim assembly 1306 in some embodiments. FIG. 16 shows the drain module 1300 installed in a tile floor 1303 without the drain trim assembly 1306 according to an embodiment. The tile floor 1303 can comprise a mosaic tile floor. One exemplary installation may include installing the drain body 1302 in a cutout in the subfloor 1301 and the lower portion 1308 (shown in FIG. 15) can be connected to a drain pipe. This can include applying a thinset mortar material or adhesive to the underside of the flange 1314 to attach the drain body 1302 to the upper surface of the subfloor 1301. It will be appreciated that the drain pipe can be 1½-inch diameter pipe, a 2-inch diameter pipe, or any other sized pipe. One or more water proof panels including a sloping floor panel can then be installed around the drain body 1302 to form a drainage slope toward the drain body 1302. For instance, the sloping floor panel can set in thinset mortar material and can define a ¼ inch or less drop per linear foot toward the drain body 1302.

According to an embodiment, a thinset mortar material or adhesive can be applied to at least a portion of the upper surface of the one or more waterproof panels surrounding the drain body 1302 and the upper surface 1342 of the drain body 1302. A moisture barrier comprising a sheet membrane can then be bonded to the flange 1314 of the drain body 1302 and at least part of the upper surface of the waterproof panels. While a sheet membrane is described, it will be appreciated that in other embodiments, the moisture barrier can comprise a liquid membrane or other type of moisture barrier.

The upper drain component 1304 can then be installed in the drain body 1302. The upper drain component 1304 can be installed in the opening 1312 to a desired height relative to the drain body 1302. The upper drain component 1304 can be installed to a desired height relative to the drain body 1302. The desired height may correspond to a final grade of the tile floor 1303. For instance, the vertical position of the upper drain component 1304 can be adjusted to the desired height using the one or more inserts 1354 (shown in FIG. 15) and the one or more set screws 1360 (shown in FIG. 15). The tiles 1305 can then be installed around the upper drain component 1304 using thinset mortar material and grout material. After the thinset mortar material and the grout material solidifies or hardens, the one or more inserts 1354 and the one or more set screws 1360 can be removed from the upper drain component 1304 and the drain module 1300 is ready for use.

As seen in FIG. 16, the drain body 1302 can be entirely concealed below the mosaic tiles 1305 with the only interruption in the tile floor 1303 from the drain module 1300 being the upper drain component 1304. More particularly, the only visible portions of the upper drain component 1304 in the tile floor 1303 are the relatively thin top of the wall portion 1346, the slotted inlet 1348, and the access cover 1350. This beneficially allows the drain module 1300 to provide a liner drain in the tile floor 1303 that increases the drainage capacity with minimal visual disruption. It also allows for the access cover 1350 to be easily and selectively removed from the upper drain component 1304 for cleaning of the drain module 1300.

The low-profile of the upper drain component 1304 and minimal width of the slotted inlet 1348 thus visually blend into the tile floor 1303. The spacer elements 1352 create a uniform gap around the upper drain component 1304 that is filed with grout material such that the grout lines surrounding the upper drain component 1304 advantageously can match the grout lines separating the mosaic tiles 1305. For instance, the grout lines surrounding the upper drain component 1304 connect the intermittent lines running between the tiles 1305.

Figure 18:
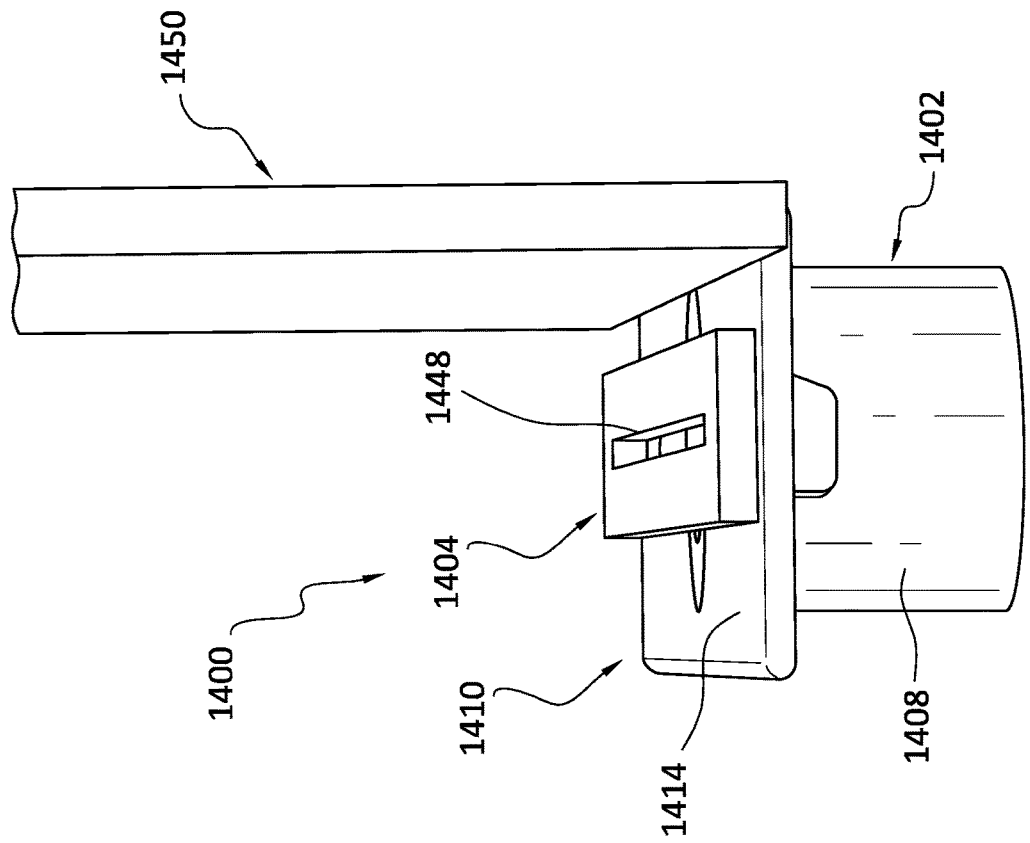
FIG. 18 illustrates the drain body and an upper drain component installed below a backwall.
Figure 17:
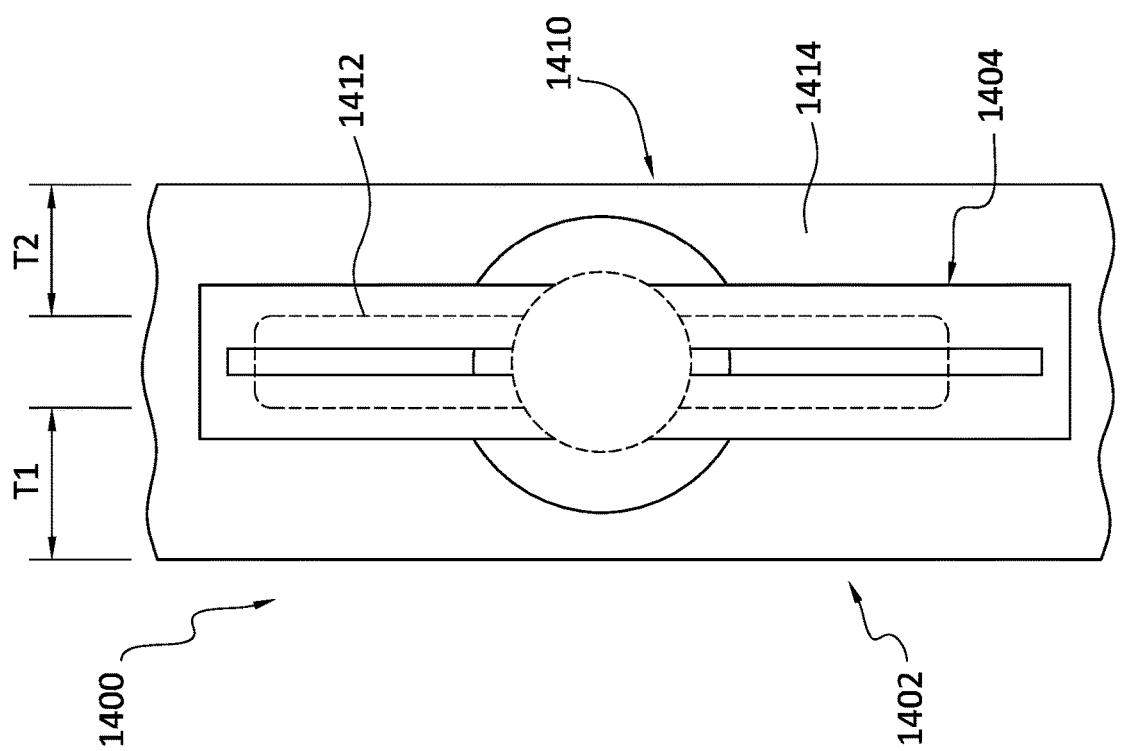
FIG. 17 is a top view of a floor drain system according to another embodiment.

FIGS. 17 and 18 illustrate a drain system comprising a drain module 1400 having a drain body 1402 and an upper drain component 1404. As discussed above, the drain body 1402 can include a lower portion 1408 and an upper portion 1410. The upper portion 1410 defines an opening 1412 and a flange 1414 surrounding the opening 1412. The flange 1414 can define a width that is sized and configured to support and provide a connection area on an upper surface of the subfloor or a substrate. The width of the flange 1414 at least in part can be configured to form a clearance between a backwall 1450 in a floor area (e.g., a wet floor area) and the opening 1412 of the drain body 1402. This clearance can allow the drain body 1402 to sit against the backwall 1450 while providing enough space for the drain pipe below a subfloor to be attached to a lower portion 1408 of the drain body 1402.

As shown, the width of the flange 1414 can vary between the sides of the drain body 1402 to accommodate different sized tiles being installed in a tile floor or on the backwall 1450 contiguous with a tile floor. For instance, the width of the flange 1414 can have a first width T1 along one side and a second width T2 along the opposite side that is smaller than the first width T1. For instance, the second width T2 can be about ¼ inch less than the first width T1.

To accommodate tiles of a smaller size (e.g., about ¼-inch-thick tile) to be installed on the backwall 1450 over the drain body 1402, the second smaller width T2 of the flange 1414 can be positioned adjacent to the backwall 1450. This advantageously allows the drain body 1402 to be installed closer to the backwall 1450 and the smaller tiles to be installed on the backwall 1450 over the drain body 1402 without undesirably extending over the opening 1412, improving the performance and aesthetics of the drain module 1400. In the illustrated embodiment, the backwall 1450 includes a wall panel resting on the flange 1414. The width T2 can be selected to accommodate the wall panel (e.g., ½ inch wall panel), mortar on the back of the tile, the tile, and grout material between the edge of the flange 1414 and the edge of the upper drain component 1404.

To accommodate tiles of a larger size (e.g., a ⅜ inch thick tile) to be installed on the backwall 1450 over the drain body 1402, the drain body 1402 can be rotated 180 degrees so that the larger width T1 of the flange 1414 faces the backwall 1450, which, in turn, offsets the opening 1412 a distance from its original position when the smaller width T2 was facing the backwall 1450. This beneficially allows for the accommodation of the larger tile over the drain body 1402 without undesirably extending over the opening 1412. It will be appreciated that the drain body 1402 can have any suitable shape and can be formed of any suitable material.

The upper drain component 1404 defines a slotted inlet 1448 positionable over the opening 1412 of the drain body 1402. According to a variation, the upper drain component 1404 can be floatable or its position shifted on the upper portion 1410. For instance, the upper drain component 1404 can be adapted so that it does not physically extend into or interface with the inside of the opening 1412 of the drain body 1402. This beneficially allows the upper drain component 1404 to be floated or shifted over the opening 1412 for lateral and/or rotational adjustment of the upper drain component relative to the opening 1412 before tiles are installed around the upper drain component 1404. This is advantageous because it allows the upper drain component 1404 to be aligned or squared to a dominant wall or other benchmark, such as surrounding tiles, up until when the adjacent tiles are installed around the upper drain component 1404 during a tile installation, streamlining installation and improving the aesthetics of the tile floor. The floating configuration of the upper drain component 1404 can also allow the drain module 1400 to be compatible with different drain components and projects. For instance, the upper drain component 1404 can be used in a retrofit application.

The various aspects and embodiments disclosed herein are for purposes of illustration and are not intended to be limiting. Additionally, the words "including," "having," and variants thereof (e.g., "includes" and "has") as used herein, including the claims, shall be open-ended and have the same meaning as the word "comprising" and variants thereof (e.g., "comprise" and "comprises").

The invention claimed is:

1. A floor drain system for installation in a tile floor over a subfloor, the floor drain system comprising:
 at least one drain module including:
  a drain body installable in the subfloor, the drain body configured for attachment to a drain pipe below the subfloor; and
  a drain trim assembly defining a linear drain channel that slopes along a length of the drain trim assembly and is intercepted by an outlet positionable over the drain body and arranged for fluid communication with the drain body, wherein the drain trim assembly is configured for installation with the tile floor over the drain body and the drain trim assembly and the linear drain channel are entirely above the subfloor without attachment to the drain body and without physically interfacing with an opening of the drain body such that the drain trim assembly and linear drain channel are floatable over the drain body for lateral adjustment and rotational adjustment relative to the drain body before adjacent tiles are installed around the drain trim assembly.

2. The floor drain system of claim 1, wherein drain trim assembly comprises a center portion defining the outlet having an elongate configuration, and a pair of wing portions extending in opposite directions from the center portion defining the linear drain channel sloping toward the outlet.

3. The floor drain system of claim 1, wherein the drain trim assembly is formed of injection molded polymer configured to match an appearance or color of the tile floor.

4. The floor drain system of claim 3, wherein the drain trim assembly is without metal surfaces.

5. The floor drain system of claim 1, wherein the drain body includes a lower portion sized and configured to extend downwardly through the subfloor between adjacent joists supporting the subfloor.

6. The floor drain system of claim 5, wherein the drain body includes an upper portion and is sized and configured to extend downwardly through the subfloor between adjacent joists supporting the subfloor.

7. The floor drain system of claim 6, wherein the upper portion includes a flange extending radially therefrom and configured to support the drain body on the subfloor under the tile floor.

8. The floor drain system of claim 1, wherein the at least one drain module comprises at least two drain modules joined along a backwall of a wet floor area in the tile floor.

9. The floor drain system of claim 8, wherein the wet floor area defines a single slope toward the at least two drain modules.

10. The floor drain system of claim 8, wherein the at least one drain module comprises one or more drain modules located at or near an entry to the wet floor area.

11. The floor drain system of claim 10, wherein the one or more drain modules are positioned in a dry floor area outside of the wet floor area.

12. The floor drain system of claim 11, wherein the one or more drain modules comprise at least two drain modules joined in the tile floor.

13. The floor drain system of claim 1, wherein the drain trim assembly includes an access panel that is selectively removable from over a portion of the outlet of the drain trim assembly to unclog the drain pipe.

14. The floor drain system of claim 13, wherein the access panel defines a raised surface having a flattened configuration with two planar surfaces sloping toward the outlet.

15. A method of installing a floor drain system comprising:
 installing a drain body having an opening in a subfloor;
 installing an upper drain component on the drain body, the upper drain component defining an inlet; and
 installing at least one drain trim assembly with a tile floor over the subfloor, the at least one drain trim assembly defining a linear drain channel that slopes along a length of the drain trim assembly and is intercepted by an outlet positionable over the inlet of the upper drain component, wherein the drain trim assembly and the linear drain channel are installed in the tile floor is entirely above the subfloor without attachment to the drain body and without physically interfacing with the opening of the drain body such that the drain trim assembly and linear drain channel are floatable over the drain body for lateral adjustment and rotational adjustment relative to the drain body before adjacent tiles are installed around the drain trim assembly.

16. The method of claim 15, wherein the drain trim assembly is segmented into at least three parts.

17. The method of claim 15, wherein the drain body includes a lower portion sized and configured to extend downwardly below the subfloor between adjacent joists supporting the subfloor.

18. The method of claim 15, wherein a longitudinal end of the drain body extends over a joist and below the tile floor.

19. A floor drain system for installation in a tile floor over a subfloor, the floor drain system comprising:
  at least two drain modules in a tile floor along a backwall, each of the at least two drain modules including:
    a drain body installable in the subfloor and configured for attachment to a drain pipe below the subfloor;
    an upper drain component installable on the drain body, the upper drain component being vertically adjustable relative to the drain body; and
    a drain trim assembly defining a linear drain channel that slopes along a length of the drain trim assembly and is intercepted by an outlet positionable over the upper drain component, wherein the drain trim assembly is configured for installation with the tile floor and the drain trim assembly and the linear drain channel are entirely above the subfloor and without attachment to the upper drain component and without physically interfacing with an inlet of the upper drain component such that the drain trim assembly and linear drain channel are floatable over the drain body for lateral adjustment and rotational adjustment relative to the drain body before adjacent tiles are installed around the drain trim assembly.

20. The floor drain system of claim 19, wherein the drain body includes a lower portion sized and configured to extend downwardly below the subfloor between adjacent joists supporting the subfloor.

* * * * *